(12) United States Patent
Basu et al.

(10) Patent No.: US 12,451,255 B2
(45) Date of Patent: Oct. 21, 2025

(54) OPERATIONALIZING PREDICTED CHANGES IN RISK BASED ON INTERVENTIONS

(71) Applicant: Waymark, Inc., San Francisco, CA (US)

(72) Inventors: Sanjay Basu, San Francisco, CA (US); Sonia Koesterer, San Francisco, CA (US); Heather Grates, San Diego, CA (US); Aaron Baum, New Haven, CT (US); Sadiq Patel, Exeter, NH (US)

(73) Assignee: Waymark, Inc., San Francisco, CA (US)

( * ) Notice: Subject to any disclaimer, the term of this patent is extended or adjusted under 35 U.S.C. 154(b) by 191 days.

(21) Appl. No.: 18/108,437

(22) Filed: Feb. 10, 2023

(65) Prior Publication Data
US 2024/0274291 A1   Aug. 15, 2024

(51) Int. Cl.
*G16H 50/30*   (2018.01)
*G16H 40/20*   (2018.01)

(52) U.S. Cl.
CPC ............. *G16H 50/30* (2018.01); *G16H 40/20* (2018.01)

(58) Field of Classification Search
CPC ............................... G16H 50/30; G16H 40/20
USPC ................................................... 705/2
See application file for complete search history.

(56) References Cited

U.S. PATENT DOCUMENTS

2016/0125143 A1 *  5/2016  Stadler ................... G16H 50/20
                                                           705/3
2020/0279641 A1 *  9/2020  Nida ...................... G06N 20/00

FOREIGN PATENT DOCUMENTS

WO    WO-2019211250 A1 *  11/2019  ............... G06F 3/16

OTHER PUBLICATIONS

Zamzam, Aizat Hilmi Bin; Prioritisation Assessment and Robust Predictive Model for a Comprehensive Medical Equipment Maintenance Using Machine Learning Techniques; University of Malaya (Malaysia), ProQuest Dissertations & Theses, 2022. 31478465 (Year: 2022).*
Society of Actuaries, "Accuracy of Claims-Based Risk Scoring Models," Oct. 2016, Copyright 2016 Society of Actuaries, 90 pages.

(Continued)

*Primary Examiner* — Hiep V Nguyen
(74) *Attorney, Agent, or Firm* — Kilpatrick Townsend & Stockton LLP

(57) ABSTRACT

Systems and methods for operationalizing predicted changes in risk based on interventions are presented herein. In an example computer-implemented method, a computing device may store information about patients as analyzed text. The computing device can receive, from a machine learning model, intervention information for a patient. The computing device may generate a prioritized intervention list according to the intervention information and provide remote access to the prioritized intervention list. The computing device may receive updated patient engagement data as freeform text. The computing device can convert the freeform text of the updated patient engagement data into analyzed text. The computing device may receive, from the machine learning model, updated intervention information, wherein the machine learning model is re-trained based on the updated information. The computing device can generate an updated prioritized intervention list according to the intervention information.

20 Claims, 9 Drawing Sheets

(56) References Cited

OTHER PUBLICATIONS

Geller et al., "National Estimates of Insulin-Related Hypoglycemia and Errors Leading to Emergency Department Visits and Hospitalizations", Published Online Mar. 2014, 9 pages.

* cited by examiner

OPERATIONALIZING PREDICTED CHANGES IN RISK BASED ON INTERVENTIONS

FIELD

This disclosure relates generally to healthcare management, and more specifically to operationalizing predicted changes in risk based on interventions.

BACKGROUND

Traditional approaches for managing the delivery of healthcare may be incompatible with novel, modern perspectives. For example, community-based healthcare is centered on delivering care in the home and community. Organizations implementing community-based healthcare may be focused on training and deploying community-based teams to work with patients and primary care providers, with less emphasis on the collection of fees. In some cases, community-based healthcare organizations may deviate from the fee-for-service model that dominates the healthcare industry and offer value-based contracts using a capitated model of healthcare delivery. Value-based approaches to healthcare delivery may not be supported by the software tools commonly used in a fee-for-service model.

In addition, certain patient populations may not be well-supported by existing approaches to healthcare delivery. For example, patients receiving Medicaid benefits may have needs that are not reflected in the tools commonly used for managing and planning patient encounters. Medicaid patients may require care in rural or remote locations with limited connectivity or may have a preference for care at community locations for mental health reasons that are unsupported by such tools. Tools oriented around traditional models of healthcare delivery may rely on population models that may be inaccurate or based on non-representative subsets of the population. Moreover, such models may predict cost for aggregate populations but may lack predictive power for any particular Medicaid patient.

SUMMARY

Various examples are described for operationalizing predicted changes in risk based on interventions. In an example computer-implemented method, a computing device may store information about a plurality of patients in a plurality of network-based non-transitory storage devices, wherein the information includes data from a plurality of external sources and patient engagement data, stored as analyzed text. The computing device can receive, from a machine learning model, intervention information for a first patient and intervention information for a second patient, wherein the machine learning model is trained based on the information about the plurality of patients. The computing device may generate a prioritized intervention list according to the intervention information for the first patient and the intervention information for the second patient and provide remote access to the prioritized intervention list over a network to one or more client devices. The computing device may receive, from a first client device using a graphical user interface, updated patient engagement data over the network, wherein the updated patient engagement data includes updated information about the first patient and updated information about the second patient, wherein the first client device provides the updated patient engagement data as freeform text. The computing device can convert the freeform text of the updated patient engagement data into analyzed text and add the analyzed text of the updated patient engagement data to the patient engagement data. The computing device may receive, from the machine learning model, updated intervention information for the first patient and updated intervention information for the second patient, wherein the machine learning model is re-trained based on the updated information about the first patient and the updated information about the second patient. The computing device can generate an updated prioritized intervention list according to the intervention information for the first patient and the intervention information for the second patient. The computing device can automatically generate a message containing the updated prioritized intervention list whenever the patient engagement data is updated and transmit the message to the one or more client devices over the network.

An example system may include one or more processors configured to store information about a plurality of patients in a plurality of network-based non-transitory storage devices, wherein the information includes data from a plurality of external sources and patient engagement data, stored as analyzed text. The one or more processors can receive, from a machine learning model, intervention information for a first patient and intervention information for a second patient, wherein the machine learning model is trained based on the information about the plurality of patients. The one or more processors may generate a prioritized intervention list according to the intervention information for the first patient and the intervention information for the second patient and provide remote access to the prioritized intervention list over a network to one or more client devices. The one or more processors may receive, from a first client device using a graphical user interface, updated patient engagement data over the network, wherein the updated patient engagement data includes updated information about the first patient and updated information about the second patient, wherein the first client device provides the updated patient engagement data as freeform text. The one or more processors can convert the freeform text of the updated patient engagement data into analyzed text and add the analyzed text of the updated patient engagement data to the patient engagement data. The one or more processors may receive, from the machine learning model, updated intervention information for the first patient and updated intervention information for the second patient, wherein the machine learning model is re-trained based on the updated information about the first patient and the updated information about the second patient. The one or more processors can generate an updated prioritized intervention list according to the intervention information for the first patient and the intervention information for the second patient. The one or more processors can automatically generate a message containing the updated prioritized intervention list whenever the patient engagement data is updated and transmit the message to the one or more client devices over the network.

An example non-transitory computer-readable medium may store a set of instructions that include one or more instructions that, when executed by one or more processors of a device, cause the device to store information about a plurality of patients in a plurality of network-based non-transitory storage devices, wherein the information includes data from a plurality of external sources and patient engagement data, stored as analyzed text. The instructions may contain an operation to receive, from a machine learning model, intervention information for a first patient and intervention information for a second patient, wherein the machine learning model is trained based on the information about the plurality of patients. The instructions may contain an operation to generate a prioritized intervention list according to the intervention information for the first patient and the intervention information for the second patient and provide remote access to the prioritized intervention list over a network to one or more client devices. The instructions may contain an operation to receive, from a first client device using a graphical user interface, updated patient engagement data over the network, wherein the updated patient engagement data includes updated information about the first patient and updated information about the second patient, wherein the first client device provides the updated patient engagement data as freeform text. The instructions can contain an operation to convert the freeform text of the updated patient engagement data into analyzed text and add the analyzed text of the updated patient engagement data to the patient engagement data. The instructions may contain an operation to receive, from the machine learning model, updated intervention information for the first patient and updated intervention information for the second patient, wherein the machine learning model is re-trained based on the updated information about the first patient and the updated information about the second patient. The instructions can contain an operation to generate an updated prioritized intervention list according to the intervention information for the first patient and the intervention information for the second patient. The instructions may contain an operation to automatically generate a message containing the updated prioritized intervention list whenever the patient engagement data is updated and transmit the message to the one or more client devices over the network.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
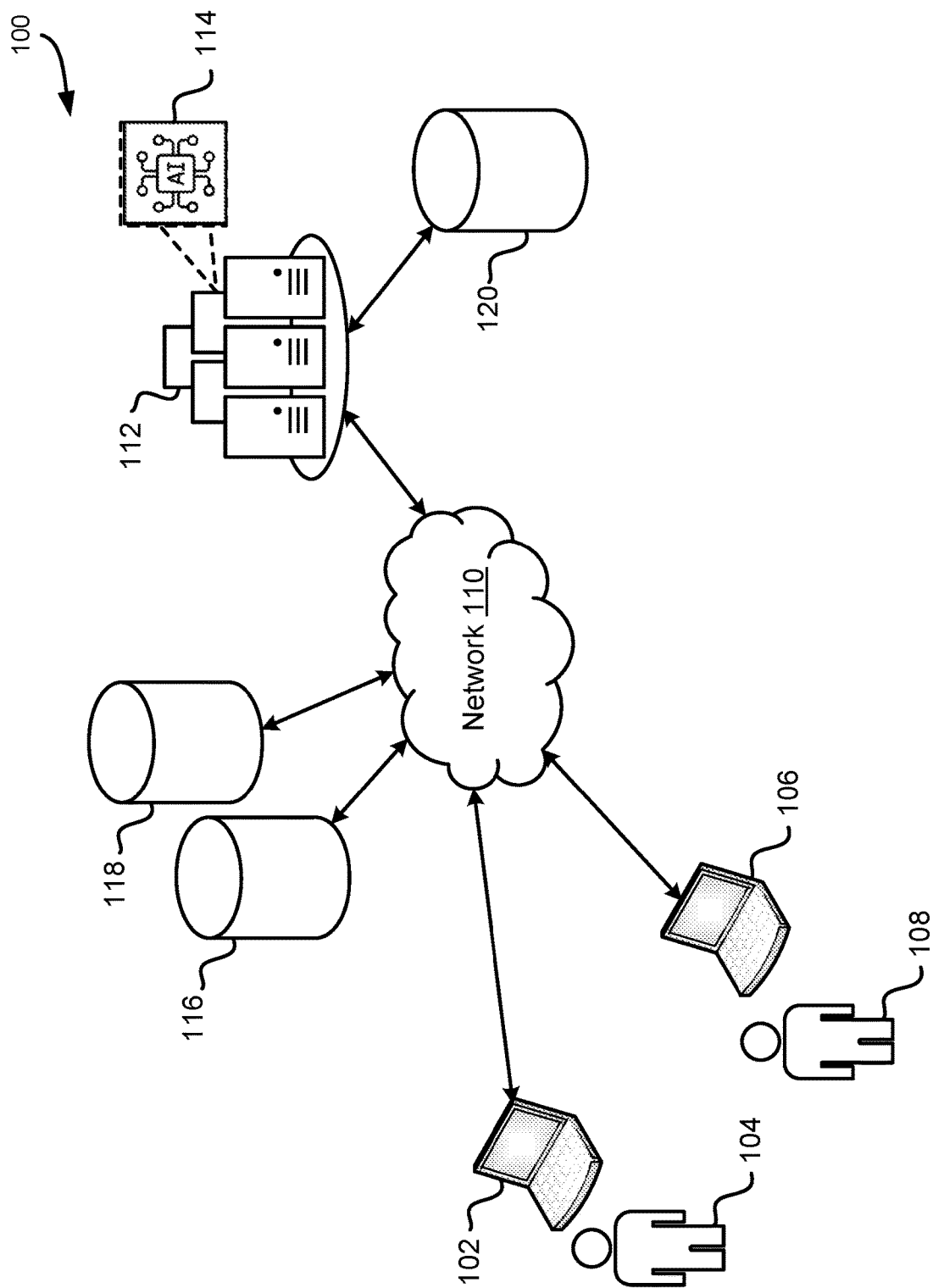
FIG. 1 depicts an example of a system for operationalizing predicted changes in risk based on interventions, according to some aspects of the present disclosure.

Examples are described herein in the context of operationalizing predicted changes in risk based on interventions. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Traditional approaches for managing the delivery of healthcare may be incompatible with novel, modern perspectives. Value-based approaches to healthcare delivery may not be supported by the tools commonly used in a fee-for-service model. For example, delivery of healthcare has traditionally been documented using electronic health record ("EHR") software. EHR software is focused on fee-for-service billing and may be organized to optimize the assignment of billing codes to encounter notes. Healthcare providers operating in the context of different economic models may find EHR software incompatible with their healthcare delivery model. Additionally, EHR software may not be configured to incorporate data from multiple sources.

Likewise, patient engagement has traditionally been managed using customer relationship management ("CRM") software. CRM software may be optimized for managing brief encounters with customers in a commercial context, but it is not suitable for tracking a longitudinal relationship over multiple episodes of care. Moreover, CRM software may not be built for mobile teams operating in rural or remote locations with limited Wi-Fi or cellular signal. Finally, CRM software may not be built for interactions with patients who may have limited or dynamic access to the Internet and phone, or who may have a preference for in-person visits at community sites.

In addition, certain patient populations may not be well-supported by existing approaches to healthcare delivery. For example, patients receiving Medicaid benefits may have needs that are not reflected in the tools commonly used for managing and planning patient encounters. Medicaid patients may require care in rural or remote locations with limited connectivity or may have a preference for care at community locations for mental health reasons that are unsupported by such tools. Tools oriented around traditional models of healthcare delivery may rely on population models that may be inaccurate or based on non-representative subsets of the population. Moreover, such models may predict cost for aggregate populations but may lack predictive power for any particular Medicaid patient. The innovations of the present disclosure can enable community-based care teams to learn which patients to outreach, what the optimal modes of outreach are, for particular patients, and how to maximize the improvement of healthcare quality outcomes and costs upon outreaching those patients.

Some approaches to reducing cost and improving outcomes may include modeling the cost of caring for patients at the population level. However, such models may be inaccurate or based on non-representative subsets of the population. For example, some models may lack accuracy in long-tail probability distributions that can correspond to Medicaid populations. The available Medicaid data may be of poor quality, relative to Medicare or private insurance data. Moreover, such models may predict cost for aggregate populations but may lack predictive power for any particular patient. Certain aspects of the present disclosure aim to deliver correctly timed interventions for particular patients.

Some approaches to reducing cost and improving outcomes may include machine learning models. For example, some machine learning models may include recommendation or steerage models, which may be trained to suggest the best action to take at a given time. Such models are usually ineffective when trained only using traditional EHRs or insurance claims data. EHRs and insurance claims are created for financial reimbursement purposes. Machine learning models trained using such data may not be able to identify which intervention will be most effective for a particular patient, whether that patient will benefit from that intervention, and which modality for carrying out the intervention will yield the best results.

Certain aspects of the present disclosure provide systems and methods to enrich traditional medical records and insurance claims data with new information generated from patient engagements such as details about social relationships, different forms of patient outreach, patient outcomes, and other social determinants of health. Such information may enhance the ability of providers to identify "rising risk" patients who are not yet "high-cost claimants" but are on the pathway to potentially experiencing healthcare catastrophes. Disclosed methods may improve on predicting the risk of negative outcomes for a population to predicting which intervention is most beneficial for a particular patient. For example, a young Medicaid patient recently diagnosed with poorly controlled diabetes may be a candidate for a variety of low-cost interventions with significant benefits that may not be reflected in a model that predicts the probability of a bad outcome for a cohort of comparable patients.

The example systems and methods discussed in the present disclosure may utilize the output of a machine learning model for operationalizing predicted changes in risk based on interventions. For example, an example system includes a computing device that is a healthcare data manager or other suitable component for predicting risk and changes in risk based on interventions. The computing device receives external data from a variety of sources. For example, the external data sources may include insurance claims data and EHRs, among other sources of data. The computing device receives additional data including patient engagement data. The patient engagement data may be generated by a healthcare provider using a healthcare CRM. For example, the healthcare provider may gather patient engagement data by interviewing patients using a healthcare CRM software application provided on a client device, like a tablet or smartphone. The patient engagement data may include patient narratives, relationships, and social determinants of health, among other components. The patient engagement data may be linked with the data from external sources to group data about specific patients.

In the example system, the external data and the patient engagement data are used to train the machine learning model. The trained machine learning model then predicts risk and changes in risk based on selected interventions for particular patients. The external data and patient engagement data are used to identify interventions that reduce the predicted risk in terms of cost or likelihood of recovery. For example, patient engagement data may be used to identify a urinary tract infection prior to a costly emergency room visit or to recommend a mammogram at an age appropriate to reduce the risk of undiagnosed cancer. In some examples, the machine learning model may be an ensemble model that includes one or more machine learning models. The trained machine learning model is used to generate a score. The score corresponds to a likelihood of success associated with a particular intervention. For example, a high score may indicate a significant expected reduction in cost or increase in the probability of recovery. The score is composed using the outputs of the one or more machine learning models according to weights assigned to the models. The score may be provided to applications that can use the score to, for example, rank, sort, or recommend interventions. The applications may include the healthcare CRM that can be used by healthcare providers to select, plan, and document interventions for particular patients.

In some examples, the computing device may receive feedback associated with the patient. For example, a healthcare provider may determine the outcome or cost of a particular intervention. The feedback may contain data associated with the intervention including, for example, medications included with the intervention or data from hospital visits resulting from the intervention. Feedback may comprise factors including appropriateness, interpretability, relevance, missing elements, overemphasis, as well as other considerations. For example, a healthcare provider may use a healthcare CRM provided by a client device to generate and provide the feedback to the computing device. The computing device may process the feedback and generate processed patient information, including identification of one or more predictor variables and one or more outcome variables. The processed patient information may be used, with the data from external sources and/or the patient engagement data, to further train the trained machine learning model. For example, the feedback may be used to continuously update and train the machine learning model while it is operating. The continuous development and receipt of feedback and its incorporation into the training of the machine learning is referred to as the operationalization of the feedback.

Example systems and methods for operationalizing predicted changes in risk based on interventions are presented herein. For example, in one computer-implemented method, a computing device for operationalizing predicted changes in risk based on interventions may store information about a plurality of patients in one or more databases, including data received from a variety of external data sources and from patient engagement data. The data may be linked to correspond with particular patients. For example, data from disparate external sources and the patient engagement data may be linked using an identifying property that uniquely identifies a particular patient like name or social security number. The patient engagement data may be stored in a format suitable for inclusion in the machine learning model's training data. For example, the patient engagement data may be stored as analyzed text. Analyzed text may be coded, marked up using a system of annotations, translated, interpreted by a pre-trained natural language processing ("NLP") model, or stored in another suitable format for inclusion in the training data.

The computing device may receive, from a machine learning model trained using the information about a plurality of patients, intervention information for one or more patients. The intervention information may include predictions of risk and predictions of changes in risk for particular interventions. For example, the risk prediction may include an expected cost of treatment, a probability of recovery, or a likelihood of a negative outcome. The computing device may also generate a prediction of the change in risk for particular interventions. For example, for a patient with diabetes, the change in risk prediction may include a reduction in the expected cost of treatment for a course of insulin or an increase in the probability of recovery for a particular lifestyle change. The intervention information may include recommended times, locations of the proposed interventions, and optimal modes of outreach, among other intervention properties. In particular, the machine learning model may be configured to use the patient engagement data to make specific, prioritized predictions, tailored to particular patients, that could not be made with the external data alone. The computing device may output both the risk prediction and the change in risk prediction for particular interventions.

The computing device may generate a prioritized intervention list from the intervention information and provide access to the list to one or more client devices over a network. For example, the client devices may include a healthcare CRM including tools that allow for the display, manipulation, and updating of the patient intervention list. The computing device may receive, from a client device, feedback including updated patient engagement data about one or more patients. For example, a healthcare provider using the healthcare CRM may perform one of the interventions from the prioritized intervention list on a patient and create an encounter note including a narrative of the intervention. The updated information may include freeform text, among other data. For instance, the updated information may include encounter notes, text messages, and emails, between and among healthcare providers and patients. The updated information may include data about personality traits, behaviors, and preferences of the plurality of patients.

The computing device may convert the freeform text of the updated patient engagement data into analyzed text, or a form suitable for use in the training data of the machine learning model. The computing device can add the updated patient engagement data to the existing patient engagement data, which can be used to re-train or continuously train the machine learning model. The re-trained or continuously-trained machine learning model can send updated intervention information for the one or more patients to the computing device. The computing device may then generate an updated prioritized intervention list and send it to the client devices, including a message, whenever the patient engagement data is updated. For example, the message may be an email, text message, or mobile device notification and may include some or all of the updated patient intervention list.

In some examples, the one or more client devices providing a healthcare CRM software tool may display a patient list on a graphical user interface ("GUI") based on the prioritized intervention list. The patient list may include one or more patients from the plurality of patients and may be ranked according to the prioritized intervention list or based on a score provided by the machine learning model. In other words, patients can be organized according to priority of intervenability. Patients in the patient list may include one or more goals. The goals may be used to select, organize, or prioritize interventions. For example, a healthcare provider may create a goal related to food insecurity. Interventions intended to combat food insecurity can be associated with that goal and associated goals can be used as additional input to the patient engagement data for use in generating predictions for changes in risk for those interventions.

In some examples, the patient list may include one or more routes based on the prioritized intervention list. The patient list may be sorted according to route. For example, the computing device may determine, from the patient list, the most efficient route for a healthcare provider to drive to provide interventions to the patients in the list. Routes, including geographical details of the locations of patients and interventions, can be used as additional input to the patient engagement data for use in generating predictions for changes in risk for those interventions.

This illustrative example is given to introduce the reader to the general subject matter discussed herein and the disclosure is not limited to this example. The following sections describe various additional non-limiting examples and examples of operationalizing predicted changes in risk based on interventions.

Referring now to FIG. 1, FIG. 1 shows an example system 100 for operationalizing predicted changes in risk based on interventions, according to some aspects of the present disclosure. The example system includes two client devices 102, 106 and a remote cloud server system 112. These components are communicatively connected to each other via one or more intervening networks, collectively illustrated as network 110. The intervening networks may include the internet or any other suitable networks that may include any local area network ("LAN"), metro area network ("MAN"), wide area network ("WAN"), cellular network (e.g., 3G, 4G, 4G LTE, 5G, etc.), or any combination of these.

The cloud server system 112 includes one or more server computers located remotely from the client devices 102, 106. The cloud server system 112 may include a healthcare data manager that executes software to predict risk and changes in risk for particular interventions for specific patients. To do this, the cloud server system 112 maintains one or more machine learning models 114 that have been trained to predict risk and changes in risk for particular interventions, as will be discussed in greater detail below. The machine learning models 114 may be an ensemble of machine learning models whose outputs are combined to produce a composite score. The composite score may be calculated according to weights on the models making up the machine learning models 114, such that some models make greater or lesser contributions to the composite score.

The cloud server system 112 receives data from one or more external data sources 116, 118. The external data sources 116, 118 may include data from a variety of sources external to the cloud server system 112. The external data sources 116, 118 may include, for example, public health records, data from academic research, or insurance claims data, among many others. The external data sources 116, 118 can also include data collected by the healthcare data manager and stored, for example, in a cloud storage provider. The cloud server system 112 also receives data from one or more internal data sources 120. For example, the internal data sources may include patient engagement data collected by a healthcare provider 108 using a client device 106 that is subsequently provided to the cloud server system 112, as will be discussed below.

The cloud server system 112 may host one or more applications. For example, the cloud server system may host the user-facing and administrator-facing components of a healthcare customer relationship management ("CRM") system. The healthcare customer relationship management ("CRM") system may be a part of the healthcare data manager, or it may be a standalone system. The healthcare CRM system may include components for displaying and updating a GUI, an application programming interface ("API"), and various storage components and devices. The healthcare CRM system may receive data from the external data sources or from the machine learning models 114 and provide that data to users of the healthcare CRM system using various representations. For example, the machine learning models 114 may provide predictive information that can be used to organize data displayed to users according to the predictive information.

One of the two depicted client devices 106 is executing healthcare CRM. Healthcare CRM software may be used to plan and manage patient care. The client device 106 is used by a healthcare provider 108 to, for example, view patient lists, manage patient care, create goals, create encounter notes, generate feedback, and evaluate and select interventions and tasks. The client device 106 interacts with the cloud server system 112 to, for example, receive data including interventions for specific patients and feedback on the recommended interventions. The healthcare CRM software can also receive communications from patients, other health providers, or the cloud server system 112, such as text or voice messages, as well as other information about patient health and care.

The other depicted client device 102 is used by an administrator 104 of the healthcare data manager or of the healthcare CRM system to receive feedback from the other client device 106 and to monitor the output of the machine learning models 114. The administrator can review feedback and adjust the weightings on the models making up the machine learning models 114 in accordance with the feedback received from the client device 106. The administrator 104 may also review feedback from the client device 106 and add additional predictor and outcome variables to the one or more machine learning models 114 according to the feedback. The client device 102 also allows the administrator of the healthcare data manager 104 to communicate with the healthcare provider 108, such as to text message or have voice or video calls with the healthcare provider 108 in order to assist with interpretation of the feedback.

The client devices 102, 106 may be any suitable client device for the respective user, including handheld devices (such as smartphones and tablets), portable devices (such as laptop computers), or desktop computers. In some examples the client devices 102, 106 may execute client software via a web browser by accessing a link (e.g., a uniform resource locator or "URL") to a web application hosted by the cloud server system 112. In other examples, the client software for one or both client devices 102, 106 may be locally executed. And while this example system 100 shows only two client devices 102, 106, any number of client devices may be included in example systems according to this disclosure. Further, it should be appreciated that the client devices 102, 106 may be remote from each other. For example, the healthcare provider 108 may have their client device 106 at their home, while the administrator of the healthcare data manager 104 may have their client device 102 at their office.

Figure 2:
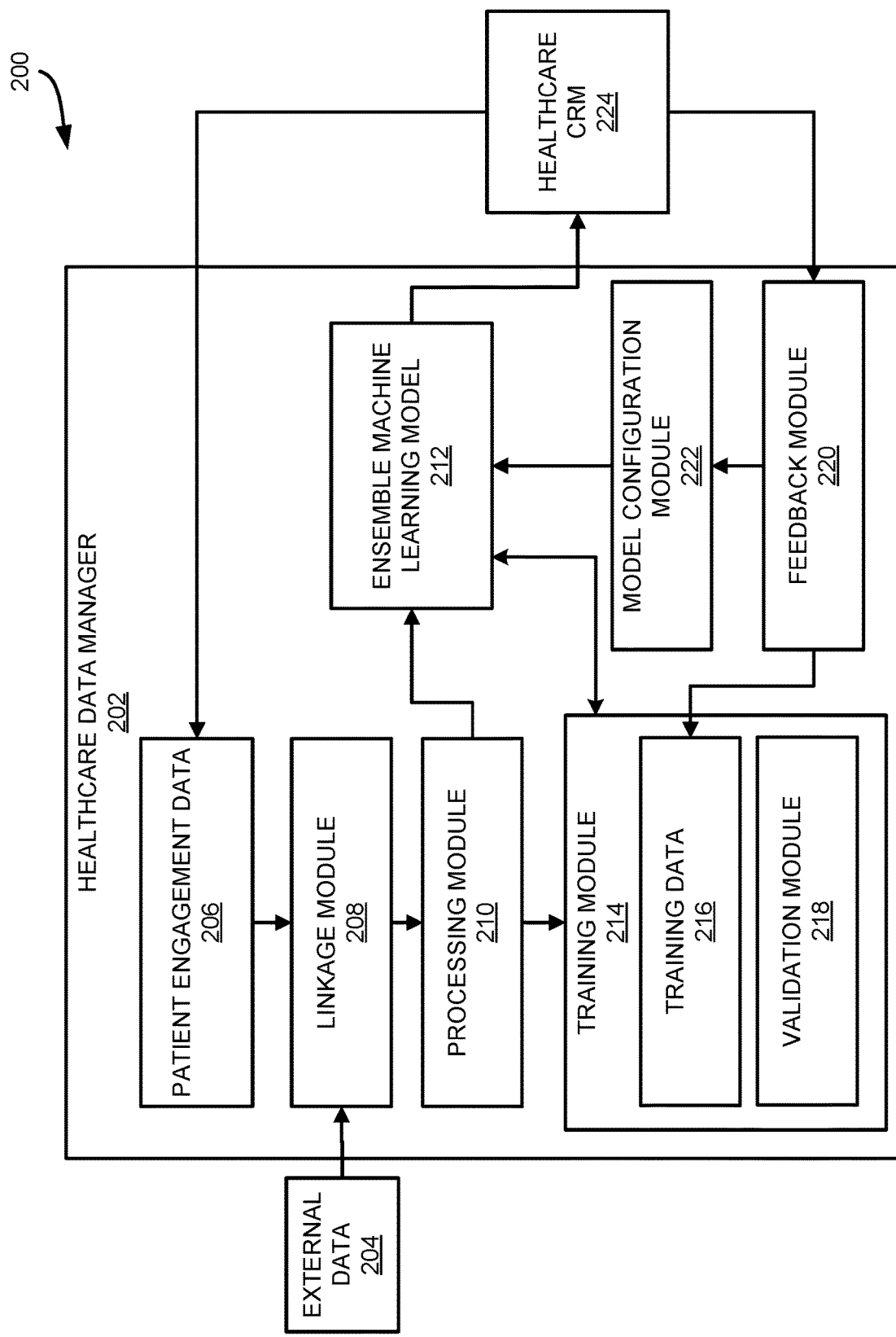
FIG. 2 depicts an example of a system for operationalizing predicted changes in risk based on interventions, according to some aspects of the present disclosure.

Referring now to FIG. 2, FIG. 2 depicts an example of a system 200 for operationalizing predicted changes in risk based on interventions, according to some aspects of the present disclosure. The system 200 includes a healthcare data manager 202. The healthcare data manager 202 may be associated with one or more healthcare providers. The healthcare data manager 202 may be a standalone server, multiple servers connected over a network, one or more virtual machines running a cloud provider, or other suitable configuration.

The healthcare data manager 202 receives data from various sources. The data may be used as input to an ensemble machine learning model 212 or to train the ensemble machine learning model 212. The data may include external data 204 or patient engagement data 206. The external data 204 may include data from a variety of sources external to the healthcare data manager 202. The patient engagement data 206 includes data collected by a healthcare provider that is subsequently provided to the healthcare data manager 202. For example, the patient engagement data 206 may include data generated by and provided by a healthcare provider using a healthcare CRM 224.

The external data 204 and the patient engagement data 206, as well as any other sources of data, are combined by a linkage module 208. The linkage module 208 may aggregate and process data from one or more data sources to generate data that is keyed to individual patients via a linkage. The linkage may be a subset of the data that can be used to join data from disparate sources. For example, data from a first source and a second source may be combined using unique identifiers common to both sources, like a full name or social security number. In some examples, some sources of external data 204 may include events that are uniquely associated with an individual patient. Likewise, the patient engagement data 206 may include details associated with individual patients. Some sources of external data 204, however, may include data associated with populations, regions, symptoms, conditions, periods of time, etc. that are not linked directly to individual patients.

The linkage module 208 can combine disparate data sources into a format that is suitable for consumption by or training of the ensemble machine learning model 212. In some examples, the linked data may include time-ordered or time-series data for individual patients. In other words, the linked data may include data structures associated with individual patients at particular times. The linked data may include a plurality of data structures for individual patients at different times. For example, linked data may include rows in a relational database. Rows may correspond to individual patients' status at a particular moment in time, such as based on test results or assessment data. Rows may contain data linked from the external data 204 and the patient engagement data 206, that corresponds to the particular moment in time. For example, the row may include linked data that indicates that an individual patient was admitted to the hospital on a particular date, a measurement of air pollution on that date, and the probability of occurrence of a medical condition for patients with comparable demographic characteristics on that date. The use of linked data as input to and as a source of training data for the ensemble machine learning model 212 may allow for the prediction of both risk, including healthcare costs, as well as the prediction of change in risk for specific interventions for individual patients.

The healthcare data manager 202 includes a processing module 210. The processing module 210 may define predictor variables and outcome variables. The predictor variables may correspond to machine learning features and outcome variables may correspond to machine learning examples. The processing module 210 may receive the linked data from the linkage module 208 and identify candidate data structures for definition as predictor variables and outcome variables. In some examples, the processing module 210 may define predictor variables and outcome variables automatically according to predefined criteria. In some examples, the predictor variables and outcome variables may be identified or defined manually by users of the healthcare data manager 202. Predictor variables may include, among others, data on demographics, social determinants of health, prior claims history, diagnoses, medications, provider characteristics, residential area-level characteristics, and outreaches, engagements, and interventions by healthcare providers. In some examples, predictor variables may include feedback from users of applications consuming the output of the ensemble machine learning model 212. For example, healthcare providers may use the healthcare CRM 224 and provide feedback relating to the predictions made by the ensemble machine learning model 212. The feedback may be utilized as a predictor variable. The outcome variables may include, among others, data on ambulatory care-sensitive emergency room visits, hospitalizations, engagements with healthcare providers, medical and pharmaceutical costs, patient goal fulfillment rates, care gap closure rates by the National Committee for Quality Assurance ("NCQA") Healthcare Effectiveness Data and Information Set ("HEDIS"), and Medicaid disenrollment.

The ensemble machine learning model 212 receives input from the processing module 210. The ensemble machine learning model 212 may be a trained machine learning model or it may be trained using training data 216. The ensemble machine learning model 212 may be continuously trained using feedback from, for example, a healthcare CRM 224. The machine learning module may include an "ensemble" or "orchestra" of machine learning models trained using the same or subsets of the same training data 216. The machine learning models making up the ensemble machine learning model 212 may include one or more machine learning models. For example, the one or more machine learning models making up the ensemble machine learning model 212 may include neural networks, gradient boosted machines, random forests, generalized linear models, and recommendation or steerage models.

Any suitable machine learning model may be used according to different examples, such as deep convolutional neural networks ("CNNs"); a residual neural network ("Resnet"), or a recurrent neural network, e.g. long short-term memory ("LSTM") models or gated recurrent units ("GRUs") models, a three-dimensional CNN ("3DCNN"), a dynamic time warping ("DTW") technique, a hidden Markov model ("HMM"), a support vector machine (SVM), decision tree, random forest, etc., or combinations of one or more of such techniques—e.g., CNN-HMM or MCNN (Multi-Scale Convolutional Neural Network). Further, some examples may employ adversarial networks, such as generative adversarial networks ("GANs"), or may employ autoencoders ("AEs") in conjunction with machine learning models, such as AEGANs or variational AEGANs ("VAE-GANs").

Example machine learning models making up the ensemble machine learning model 212 may have specific advantages with respect to predicting change in risk based on interventions. For example, neural networks may be used to model complex interactions among predictor variables that cannot otherwise be explained. Gradient boosting machines can be more accurate, can learn in a non-linear fashion, can improve over time, and can be well-suited to datasets with missing values as with, for example, Medicaid data. Random forest models may work well with small datasets and a minimal amount of configuration. Reinforcement models may be well-suited to ranking potential interventions according to historical patient data.

The ensemble machine learning model 212 may include one or more types of machine learning models to obtain better predictive performance than could be obtained using any one specific kind. The machine learning model ensemble may include a model stacking algorithm. A stacking algorithm may combine or "stack" a plurality of trained machine learning models using a top-level machine learning model which may itself be trained to combine the included machine learning models according to an algorithm to achieve a specified goal. For example, the machine learning models may be combined by normalizing and weighting the contributions from the constituent models. The top-level model may be trained to adjust the weights to achieve the specified learning goal. In some examples, the machine learning model ensemble may operate according to a weighted voting process among the constituent models. Other ensemble approaches may be used including a Bayesian optimal classifier, bootstrap aggregating or "bagging," boosting, Bayesian model averaging, Bayesian model combination, a bucket of models, or other approach.

The ensemble machine learning model 212 may output a predicted risk for a given patient. For example, the predicted risk may include the expected cost in the absence of any intervention, the expected average cost for patients in a comparable cohort, the average probability of a negative outcome, or other measures of risk. The ensemble machine learning model 212 may also output a prediction of the change in risk for particular interventions. For example, the prediction of the change in risk may include a reduction in cost associated with an intervention for a particular patient, an increase in the probability of recovery associated with an intervention for a particular patient, or other measures of change in risk.

The ensemble machine learning model 212 may also output recommendations for patient priority, outreach approach, and intervention type. Patient priority may include an indication of which patients are at the highest risk for negative or expensive outcomes. Outreach approach may include an indication of which modality of contacting or interacting with patients have the highest probability of success. Intervention type may include a specific action to recommend that a patient or healthcare provider perform. A proposed intervention may include the patient that is the target of the intervention, a date and time the intervention can occur, a healthcare provider who will perform the intervention, a modality of the intervention, and a location at which the intervention may occur. For example, recommended interventions for a patient suffering from hunger may include hospitalization by a healthcare provider, an email recommending enrollment in a meal delivery program, or a text message containing a recommendation for a food pantry.

In some examples, the models composing the ensemble machine learning model 212 may be based on the geographic location of a subset of patients served by the healthcare data manager 202. For example, because factors that significantly affect healthcare in one state may differ from the factors that significantly affect healthcare in another state or other localities, such as cities, towns, neighborhoods, or regions, machine learning models may be separately trained to correspond to patients residing or living in those states or localities. In that example, risk predictions and change in risk predictions for patients in a first state may be generated by a machine learning model trained using data relevant for healthcare decisions in the first state, whereas predictions for patients in a second state may be generated by a machine learning model trained using data relevant for healthcare decisions in the second state. The machine learning models corresponding to different geographic locations may share data and they may use data that is applicable to patients at specific locations. The machine learning models may be grouped according to other criteria. For example, machine learning models could be trained that are specific to individual patients, regions, demographics, or other categorizations.

The ensemble machine learning model 212 may output a score corresponding to the recommendations for patient priority, outreach approach, and intervention type. For example, a high score may correspond to a high likelihood of a positive outcome or a significant reduction in cost, given a particular intervention for a particular patient. In some examples, the score may be provided to applications that may then rank the recommendations of the ensemble machine learning model 212 according to the score. The score may include one or more portions. The portions may be weighted contributions from the various machine learning models included in the ensemble machine learning model 212. For example, in an ensemble machine learning model 212 that includes a neural network and a recommendation or steerage model, the output of the neural network may contribute to 25% of the score and the recommendation or steerage model may contribute to 75% of the score. Appropriate normalization methods may be employed to quantify and/or scale the outputs of the various machine learning models prior to summing contributions to the score. In some examples, the outputs of the machine learning models may be combined according to an ensemble machine learning algorithm, including, for example, stacking, bagging, or boosting.

The outputs of the ensemble machine learning model 212 are sent to one or more applications including, for example, a healthcare CRM 224. The outputs of the ensemble machine learning model 212 may be provided by way of an exposed or other suitable mechanism. The healthcare CRM 224 may display the outputs of the ensemble machine learning model 212, for example, using a suitable GUI. For example, the healthcare CRM 224 may display a ranked list of interventions for a particular patient according to the score, expected cost, or other method for sorting the interventions. The healthcare CRM 224 is only an example client of the healthcare data manager 202. It should be stressed that other types of client applications may receive output from the ensemble machine learning model 212. For example, the output may be exposed over a public API which may be used in a variety of custom applications.

The training module 214 may initially train the ensemble machine learning model 212 using the training data 216 using any suitable supervised, semi-supervised, or unsupervised training technique. The training data 216 may include linked data from the linkage module 208 that has been labeled in the processing module 210. The training data 216 may include data from both the external data 204 and the patient engagement data 206. The training data 216 may be continuously updated via the feedback module 220, which may receive feedback from, for example, the healthcare CRM 224.

The training module 214 receives processed data from the processing module 210. The training module 214 may designate subsets of the processed data as training data 216, validation data, and testing data. The validation data may be used by the validation module 218 to validate the outputs of the ensemble machine learning model 212 after it has been trained. This may ensure that the resulting model is not unduly influenced by the particular characteristics of the training data 216. The testing data may be used by the validation module 218 to again validate the outputs of the ensemble machine learning model 212 to confirm that the ensemble machine learning model 212 is properly trained. The training data 216, the validation data, and the test data may be periodically updated or replaced to prevent the ensemble machine learning model 212 from overfitting the data or other potential problems.

The validation module 218 may also compare the output of the ensemble machine learning model 212 with pre-trained models. For example, the pre-trained models may include commercially available models that may be used to evaluate the performance of the one or more machine learning models making up the ensemble machine learning model 212. In some examples, a pre-trained model may generate a risk prediction. The validation module 218 can compare the risk prediction made by the pre-trained model with the risk prediction made by the one or more machine learning models to validate the performance of the one or more machine learning models or of the ensemble machine learning model 212.

The feedback module 220 receives feedback from external sources and provides the feedback to the training module 214 or to the model configuration module 222. For example, the feedback module 220 may receive feedback from a healthcare CRM 224 on the interventions corresponding to the ensemble machine learning model 212 output according to factors including appropriateness, interpretability, relevance, missing elements, overemphasis, as well as other considerations. The feedback may be added to the training data 216. The ensemble machine learning model 212 may be continuously trained as new data is added to the training data 216 via the feedback module 220. The feedback module 220 may also add data to the patient engagement data 206, which may then be input to the trained machine learning model. In some examples, the feedback may be used as a predictor variable. For instance, feedback from a healthcare provider may be based on clinical expertise that is not otherwise captured in the external data 204 or patient engagement data 206. The feedback may include recommendations or evaluations of interventions that may implicitly include the clinical expertise and may thus be used as predictor variables during offline or online training of the ensemble machine learning model 212. For example, healthcare providers using the healthcare CRM 224 may provide feedback on a given intervention associated with a score or change in risk prediction by rating the interpretability and quality of the intervention using a scale of 1 to 5 using a GUI provided by the healthcare CRM 224.

The feedback module 220 provides feedback to the model configuration module 222. The model configuration module 222 also receives input from clients of the healthcare data manager 202 that correspond to the accuracy and usefulness of the outputs of the ensemble machine learning model 212. For example, a user of the healthcare data manager 202 may determine that a ranked list of interventions for a given patient fails to sufficiently account for the socio-economic status of the patient. The user may determine that the ranking is significantly due to a contribution from a particular neural network. The user may input updated weightings of the machine learning models to the model configuration module 222 to reduce the contribution from the particular neural network. The model configuration module 222 may update the weights of the machine learning models making up the score that is output from the ensemble machine learning model 212 such that a smaller portion of the score is derived from the particular neural network. The ensemble machine learning model 212 may then output a score that includes a smaller proportional contribution from the particular neural network. In some examples, the input to the model configuration module 222 can provide input to the algorithm combining the models in the ensemble machine learning model 212. The ensemble algorithm may then update the relative importance of the constituent machine learning models according to the output of the ensemble algorithm.

Figure 3:
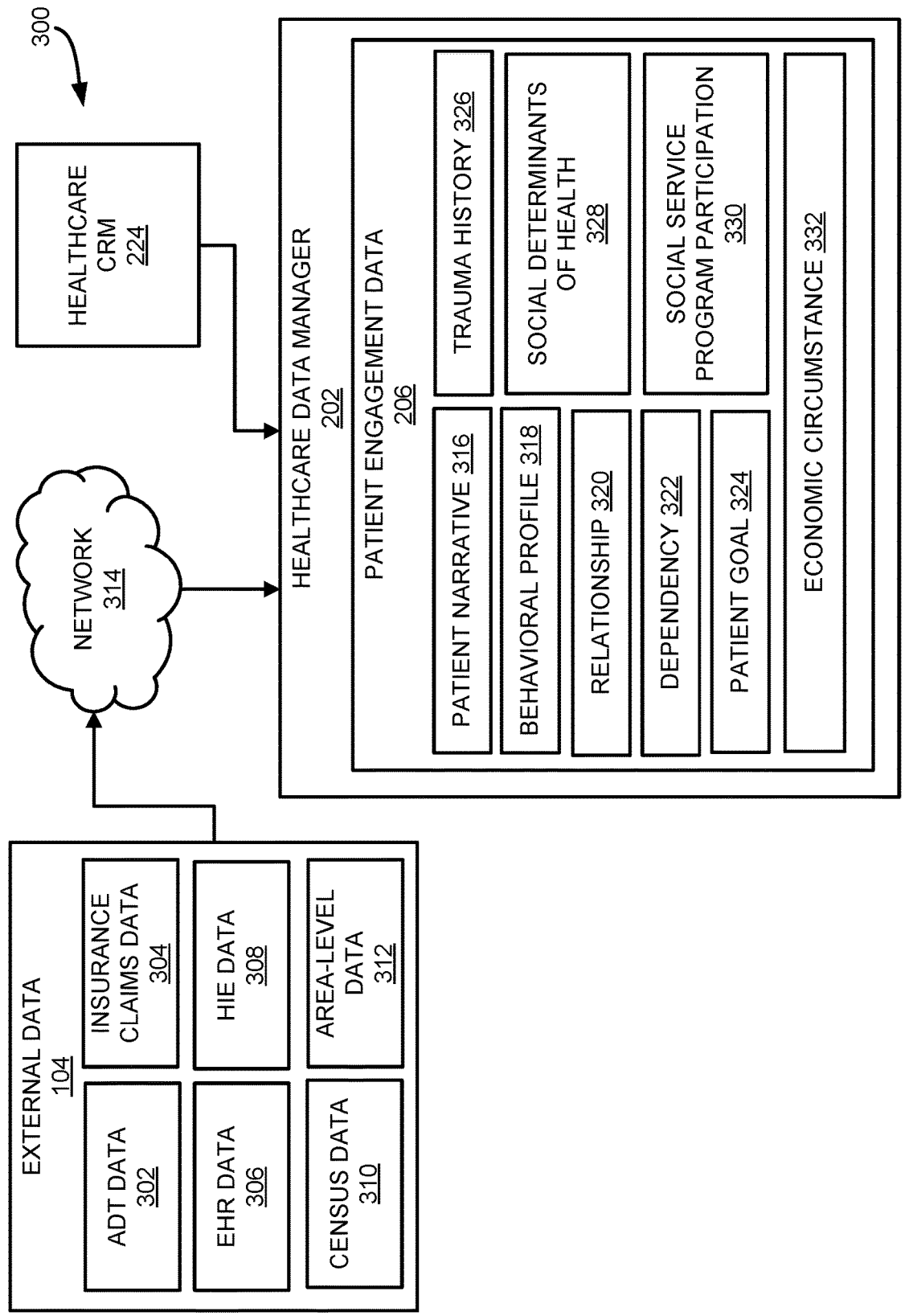
FIG. 3 depicts example data sources for operationalizing predicted changes in risk based on interventions, according to some aspects of the present disclosure.

Referring now to FIG. 3, FIG. 3 depicts example data sources 300 for operationalizing predicted changes in risk based on interventions, according to some aspects of the present disclosure. The healthcare data manager 202 may receive data from various sources. The data may be used as input to an ensemble machine learning model 212 or to train the ensemble machine learning model 212. The data may include external data 204 or patient engagement data 206.

The external data 204 may include data from a variety of sources external to the healthcare data manager 202. The external data 204 may be received by the healthcare data manager 202 through one or more networks, represented by network 314, which may include one or more public or private networks, including the internet.

The external data 204 may include admit, discharge, and transfer ("ADT") data 302. The ADT data 302 may be received in real-time, as the data is generated by an external source. The ADT data 302 may include real-time data indicating that patients have been admitted, discharged, or transferred from an emergency room or hospital. The ADT data 302 may be particularly relevant for identifying interventions that may have been expensive relative to the resultant outcome. The external data 204 may include insurance claims data 304. The insurance claims data 304 may include pharmaceutical and medical insurance claims. For example, the insurance claims data 304 may include Medicaid-specific claims of a large cohort of the population.

The external data 304 may also include electronic health records ("EHR") data 306. The EHR data 306 may include a patient's medical history, diagnoses, medications, treatment plans, immunization dates, allergies, radiology images, and laboratory and test results as well as billing data including cost and insurance coding metadata. The external data 204 may include health information exchange ("HIE") data 308. HIE data broadly refers to the transmission of healthcare data among medical facilities, providers, and patients electronically and may include medical history, medications, laboratory results, progress notes, referral data, or discharge summaries, among other data.

In some examples, the external data 204 can include census data 310. Census data 310 may include, for example, publicly available data from state and national censuses. The external data 204 may include area-level data 312. Area-level data 312 may include data applicable to individuals living or residing in particular geographic bounds. For example, the area-level data 312 may include air pollution data for a state, cancer statistics for a region, or water availability for a county, among other possibilities. It should be stressed that these data sources making up the external data 204 are just examples. The external data 204 may include additional sources of data from any external source, including sources that can be linked to individual patient data using a linkage. The linkage may be a unique identifier like a name or social security number, a geographic location, patient data, or any other data that may be used to link patient data to data from an external source.

The patient engagement data 206 generally includes patient-specific data obtained from any of various possible sources, including data collected by healthcare providers, social workers, surveys or assessments, or from patients directly. The patient engagement data 206 may include data collected by the healthcare provider that is subsequently provided to the healthcare data manager 202. For example, the patient engagement data 206 may include data generated by or provided by the healthcare CRM 224. The patient engagement data 206 may be stored within the healthcare data manager 202 as shown, but other examples are possible. For example, the patient engagement data 206 could be stored in the healthcare CRM 224 and provided to the healthcare data manager 202 via an API.

The patient engagement data 206 may also include a patient narrative 316. For example, a healthcare provider using the healthcare CRM 224 may obtain a patient narrative 316 from a patient while providing care or during a routine screening. The patient narrative 316 may include information on any subject relevant to the prediction of risk or change in risk for a given intervention. The patent narrative 316 may be in a text or audio format. Natural language processing ("NLP") or other model may be used to convert the patient narrative 316 into a machine-readable format suitable for input to the ensemble machine learning model 212.

Some examples of patient engagement data 206 can include a behavioral profile 318. For example, a healthcare provider using the healthcare CRM 224 may generate a behavioral profile 318 of a patient while providing care or during a routine screening by the healthcare provider. The behavioral profile 318 may include a summary of the behavior patterns of a patient as observed by or told to a healthcare provider. The behavioral profile 318 may be provided in a standardized format, a narrative format, or other format suitable for input to the ensemble machine learning model 212. The behavioral profile 318 can be used for clustering patients into categories that may help determine which patient personas best engage with different outreach approaches and interventions.

A relationship 320 may be included in the patient engagement data 206. For example, a healthcare provider using the healthcare CRM 224 may generate a relationship 320 of a patient while providing care or during a routine screening by the healthcare provider. The relationship 320 may be represented by a social graph, including interconnected nodes that represent the relationship 320, using text, or other suitable format for input to the ensemble machine learning model 212. The relationship 320 may include relationships among patients, providers, family members, or other individuals relevant to the prediction of risk or change in risk for a given intervention.

Included in the patient engagement data 206 may be a dependency 322. For example, a healthcare provider using the healthcare CRM 224 may generate the dependency 322 of a patient while providing care or during a routine screening. The dependency 322 may include the amount of care, the complexity of care, or the amount of time needed for care for a particular patient. The dependency 322 may include pharmaceutical dependencies or other chemical dependencies or lifestyle dependencies. The dependency 322 may be represented in a narrative format, including time-series data illustrating, for example, how the dependency 322 has changed over time. Or the dependency 322 may be represented in any suitable format for input into the ensemble machine learning model 212.

The patient engagement data 206 can also include a patient goal 324. For example, a healthcare provider using the healthcare CRM 224 may generate the patient goal 324 while providing care or during a routine screening. For example, the patient goal 324 may include an objective corresponding to a proposed intervention. A patient goal 324 may include recovery, a degree of recovery, or a particular outcome. The patient goal 324 may be represented in a narrative or other textual format, encoded according to a standardized format, or any other suitable format for input to the ensemble machine learning model 212.

In some examples, the patient engagement data 206 may include a trauma history 326. For example, a healthcare provider using the healthcare CRM 224 may generate the trauma history 326 while providing care or during a routine screening. The trauma history 326 may include information concerning past patient traumas relevant to the prediction of risk or change in risk for a given intervention. The trauma history 326 may be in a text or audio format. Natural language processing ("NLP") or other model may be used to convert the trauma history 326 into a machine-readable format suitable for input to the ensemble machine learning model 212. The trauma history 326 may include time-series data including a series of past events.

One or more social determinants of health 328 can be included in the patient engagement data 206. For example, a healthcare provider using the healthcare CRM 224 may obtain the social determinants of health 328 while providing care or during a routine screening. The social determinants of health 328 may include the conditions in the environments where patients live that may affect health, functioning, outcomes, and risks. The social determinants of health 328 may include data relating to economic stability, access to education, quality of education, access to health care, quality of healthcare, residential and work environments, social context, access to food, community context, and other factors. The social determinants of health 328 may include time-series data indicating how the social determinants of health 328 have changed over time. The social determinants of health 328 may be narrative form, standardized form, or other format suitable for input to the ensemble machine learning model 212.

Social service program participation 330 may be included in some examples of the patient engagement data 206. For example, a healthcare provider using the healthcare CRM 224 may determine social service program participation 330 while providing care or during a routine screening. The social service program participation 330 may include data concerning a patient's use of social services including temporary financial assistance programs, supplemental nutrition assistance programs, educational programs, childcare programs, foster care programs, adoption programs, senior assistance programs, homelessness programs, veteran support programs, among others. The social service program participation 330 may include time-series data indicating how the social service program participation 330 has changed over time. The social service program participation 330 may be in a narrative format, standardized format, or other format suitable for input to the ensemble machine learning model 212.

The patient engagement data 206 may also include an economic circumstance 332. For example, a healthcare provider using the healthcare CRM 224 may determine the economic circumstance 332 while providing care or during a routine screening. The economic circumstance 332 may include details relating to the patient's financial status, ability to pay, tax records, hardships, or other factors. The economic circumstance 332 may include time-series data indicating how the economic circumstance 332 has changed over time. The economic circumstance 332 may be in a narrative format, standardized format, or other format suitable for input to the ensemble machine learning model 212.

It should be stressed that these data sources making up the patient engagement data 206 are just examples. The patient engagement data 206 may include additional sources of data from any source designated by users of the healthcare data manager 202. For example, the patient engagement data 206 may include text or SMS messages sent to healthcare providers from patients or other examples of freeform text. In that example, NLP or other technologies may be used to translate the freeform text into a form suitable for input to the ensemble machine learning model 212.

Figure 4:
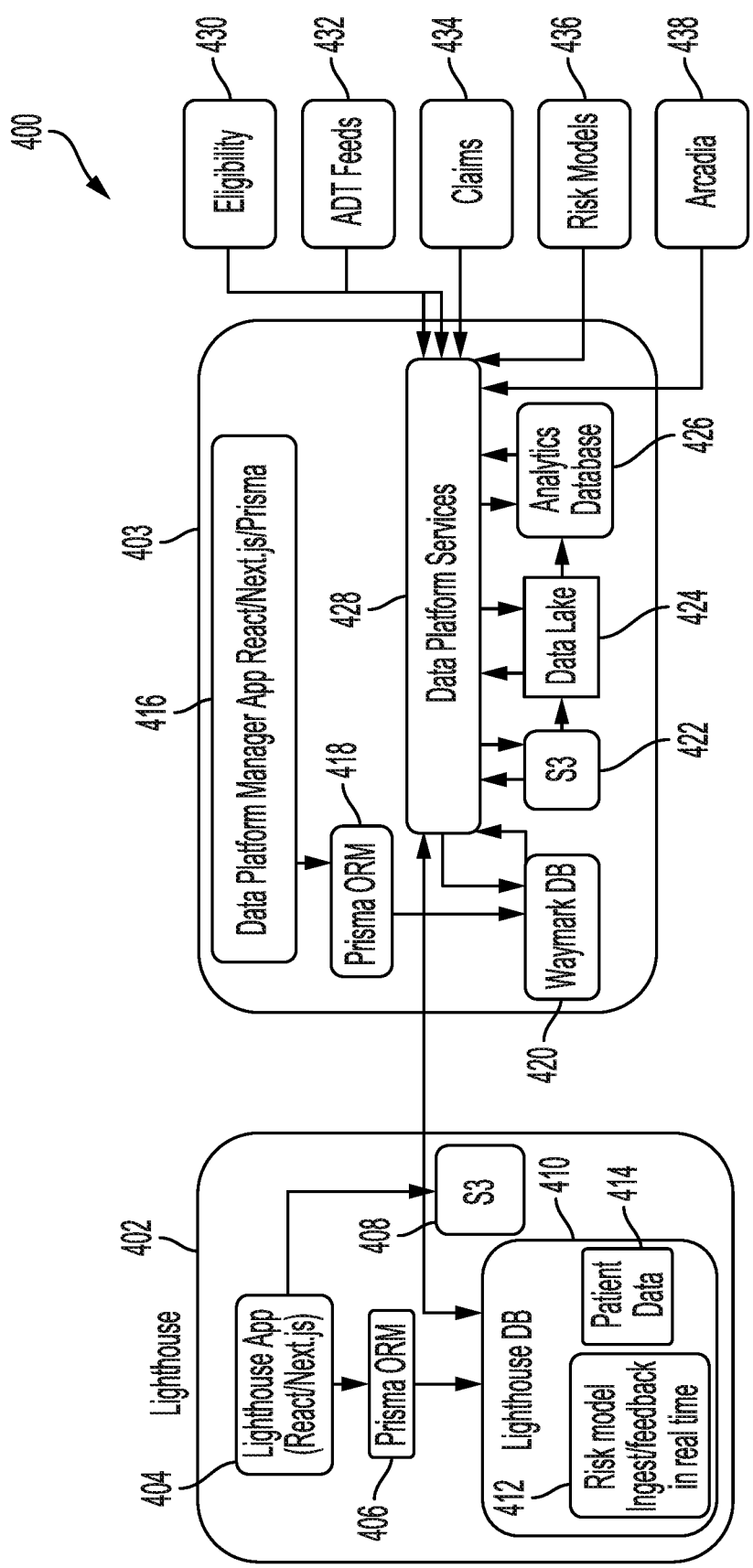
FIG. 4 shows an example system for operationalizing predicted changes in risk based on interventions, according to some aspects of the present disclosure.

Referring now to FIG. 4, FIG. 4 shows an example system 400 for operationalizing predicted changes in risk based on interventions, according to some aspects of the present disclosure. In certain embodiments, the system 400 may include components of the healthcare CRM 224. The system 400 includes a healthcare CRM module 402. The healthcare CRM module 402 and its components include hardware- or software-implemented program code required for the frontend or user-facing portion of the system 400. The healthcare CRM module 402 may be hosted in the healthcare data manager 202 or in another server or servers external to the healthcare data manager 202. For example, one or more components may be hosted in a cloud computing service. Although depicted together in FIG. 4, the components may be hosted on different servers and communicate using one or more application programming interfaces ("APIs").

The healthcare CRM module 402 includes a user application 404 that may be used by healthcare providers, administrators of the healthcare data manager 202, or other users. The healthcare CRM module 402 can receive data from these or other users and provide the data to components of the data platform module 403. The user application 404 may be executed on one or more client devices. For example, the user application 404 may be a web application that is accessed through a web browser. In other examples, the user application 404 may be a desktop or mobile device application that is installed on those devices. The user application 404 may be downloaded from an app store or marketplace and installed on a client device. The user application 404 may be implemented using one or more application frameworks. For example, the user application 404 may be implemented using React in combination with Next.js. Other application frameworks, dependencies, plugins, or addons may be used as well.

Some examples of the healthcare CRM module 402 include an object-relational mapper 406 that can be used to access data in the healthcare CRM module database 410. The object-relational mapper ("ORM") 406 provides an API for accessing data in one or more databases using an object-oriented programming language like TypeScript, Java, or Python. The ORM may be implemented using an ORM framework. For example, some implementations may use the Prisma ORM framework, but other ORM frameworks may be used including, for example, TypeORM, MikroORM, Sequelize, or Objection.js, among others.

In some examples, the ORM module 406 may be used to provide an API for accessing the healthcare CRM module database 410 by the user application 404. However, in some implementations, the healthcare CRM module database 410 may be accessed without the ORM module. For example, the healthcare CRM module database 410 can be accessed directly or using an alternative data access framework. The healthcare CRM module database 410 may be a locally hosted database that is a component of the healthcare CRM module 402 or it may be an external data store, for example, a database hosted by a cloud storage provider. The healthcare CRM module database 410 includes patient data 414. The patient data 414 may include information about one or more patients including identifying information, demographic information, patient status, patient outreach information, patient communications, patient data gathered or processed using the healthcare CRM user application 404, among other examples. The healthcare CRM module database 410 also includes risk model data 412 that may be received from the ensemble machine learning model 212 of the healthcare data manager 202.

Figure 5:
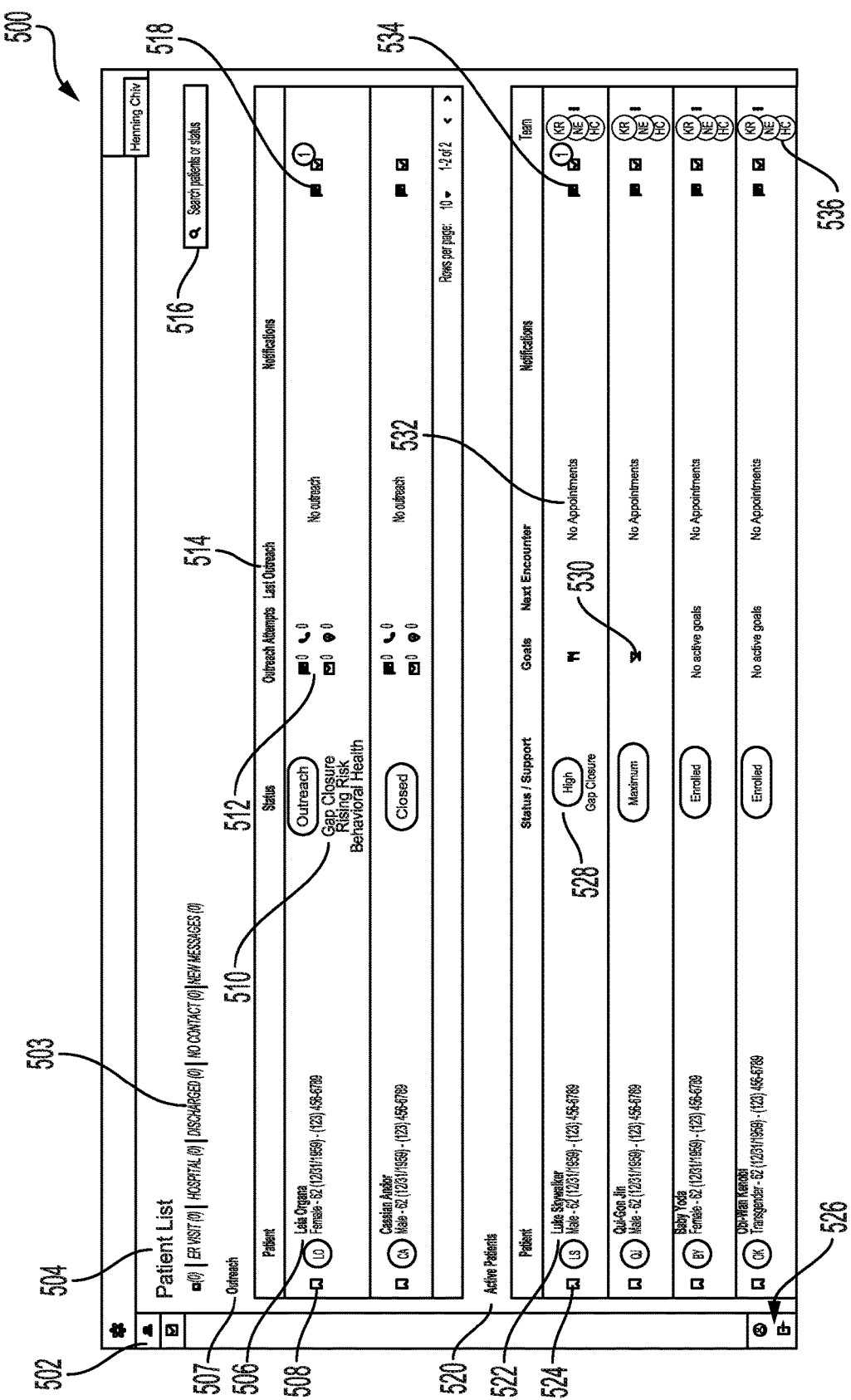
FIG. 5 shows an example of an illustration of an application for operationalizing predicted changes in risk based on interventions, according to some aspects of the present disclosure.

The ensemble machine learning model 212 can output predicted risks and predicted changes in risks for specific interventions for specific patients. The ensemble machine learning model 212 can also output scores associated with specific interventions that can be used to generate a prioritized intervention list for display by the user application 404 as illustrated in FIG. 5. The risk model data 412 may also contain feedback received from one or more client devices executing the user application 404. For example, a healthcare provider may determine the outcome or cost of a particular intervention and provide those determinations as feedback using a client device providing the user application 404. For instance, a healthcare provider may confirm that a condition or risk was present following an outreach using a toggle or other GUI element. The feedback may be stored in the risk model data 412 prior to or in addition to sending the data to the healthcare data manager 202 via the data platform microservices application 428. In certain embodiments, the data contained in the healthcare CRM module database 410 may mirror data contained in the storage modules constituting the data platform module 403.

In addition to the healthcare CRM module database 410, the user application 404 sends and receives data from a cloud storage provider 408. The cloud storage provider 408 may be used for temporary and long-term storage of data used by the user application 404. The cloud storage provider 408 may be used for website or mobile application data or hosting, caching operations, backup operations, or for storing analytics data, among other possible use cases.

The system 400 includes a data platform module 403. The data platform module 403 and its components include hardware- or software-implemented program code required for the backend or server-side portion of the system 400, as well as components needed for storing, querying, updating, and deleting data. The data platform module 403 also receives data from various sources external to the data platform module 403. The data platform module 403 may be hosted in the healthcare data manager 202 or in another server. One or more components may be hosted in a cloud computing service. Although depicted together in FIG. 4, the components may be hosted on different servers and communicate using one or more application programming interfaces ("APIs").

The data platform module 403 includes a manager application 416. The manager application 416 can be used by administrators, healthcare providers, data scientists, or other users to configure, operate, and maintain the components making up both the healthcare CRM module 402 and the data platform module 403. Like the user application 404, the manager application 416 may be provided by one or more client devices. For example, the manager application 416 may be a web application that is accessed through a web browser. In other examples, the manager application 416 may be a desktop or mobile device application that is installed on those devices. The manager application 416 may be downloaded from an app store or marketplace and installed on a client device. The manager application 416 may be implemented using one or more application frameworks. For example, the manager application 416 may be implemented using React in combination with Next.js. Other application frameworks, dependencies, plugins, or addons may be used as well.

The data platform module 403 includes a data platform microservices application 428. The data platform microservices application 428 receives and sends data from various storage components, including the data platform module database 420, cloud storage provider 422, data lake 424, and analytics database 426, as well as external data sources 430, 432, 434, 436, 438. The data platform microservices application 428 can perform data transformations, validations, and provide data for use in applications, like the ensemble machine learning model 212 and the user application 404.

Some examples of the data platform module 403 include an ORM 418 that can be used to access data in the data platform module database 420. The ORM 418 may be implemented using an ORM framework. For example, some implementations may use the Prisma ORM framework, but other ORM frameworks may be used including, for example, TypeORM, MikroORM, Sequelize, or Objection.js, among others.

In some examples, the ORM 418 is used to access data in the data platform module database 420. However, in some implementations, the data platform module database 420 may be accessed without the ORM module. For example, the data platform module database 420 can be accessed directly or using an alternative data access framework. The data platform module database 420 may include data used to configure, operate, and maintain the components making up both the healthcare CRM module 402 and the data platform module 403, as well as other data. Other storage components include the cloud storage provider 422, the data lake 424, and the analytics database 426. The cloud storage provider 422 may be used for temporary and long-term storage of data used by the manager application 416. The cloud storage provider 422 may be used for website or mobile application data or hosting, caching operations, backup operations, or for storing analytics data, among other possible use cases. The data lake 424 may be used to store unstructured data from a variety of sources for later analysis or to back up other storage components. The analytics database 426 stores data relevant for the calculation of performance metrics for the user application 404 and the manager application 416, as well as historical records of the metrics. The metrics may be provided by the data platform microservices application 428 to the manager application 416 for use in, for example, visualizations such as charts and reports.

The data platform microservices application 428 receives eligibility data 430 from one or more managed care organizations ("MCOs"). For example, the eligibility data 430 may include monthly eligibility files. Eligibility files may include, for instance, eligibility for drug benefit coverage services under a managed health care plan. This data may be used to determine patients' eligibility for services provided by a healthcare provider using the user application 404 on a client device. The data platform microservices application 428 also receives ADT feeds 432. The ADT feeds 432 may include real-time data indicating that patients have been admitted, discharged, or transferred from an emergency room or hospital. The ADT feeds 432 may provide near-real-time updates to the user application 404. Claims data 434 is provided to the data platform microservices application 428. Claims data 434 may include insurance claims data. The claims data 428 may be used to provide updates to the user application 404 concerning treatments or procedures recently obtained by patients. The data platform microservices application 428 also receives population health management data 438. For example, the population health management data 438 may be provided by a third-party data provider or broker including, for example, Arcadia. In some examples, the data platform microservices application 428 includes a claims processing tool (not shown). The population health management data 428 may also be used for the validation of results produced by the claims processing tool.

The data platform microservices application 428 receives risk model data 436 from the ensemble machine learning model 212 included in the healthcare data manager 202. Risk model data 436 can include predictions of risk or predictions of changes in risk based on particular interventions. Risk model data 436 can also include scores, rankings, or other relative measurements for interventions. The risk model data 436 may be provided as input to the user application 404 including, for example, prioritized intervention lists which can be displayed on client devices, and which may be the subject of feedback from users of the user application 404. The feedback may be provided to the ensemble machine learning model 212 and be used to re-train the ensemble machine learning model 212 to reduce risk for particular interventions.

Referring now to FIG. 5, FIG. 5 shows an example of an illustration of an application 500 for operationalizing predicted changes in risk based on interventions, according to some aspects of the present disclosure. The application 500 may be a GUI provided by the user application 404 to one or more client devices. For example, the application 500 may be illustrative of the GUI that would be displayed on the client device 106 of a healthcare provider 108 using a healthcare CRM 124. The application may have one or more modes that can be selected using a mode selector 502. For example, in FIG. 5 application 500 is shown in the patient list 504 mode. Other modes may include tasks, settings, in addition to other modes not shown.

The application 500 depicts a patient list 504. The patient list 504 may be displayed in accordance with a prioritized intervention list provided by the healthcare data manager 202, generated, for example, using scores provided by the ensemble machine learning model 212. The patient list 504 can be filtered using one or more filters 503. For example, the "DISCHARGED" filter can be used to only display patients who have been discharged from the hospital. In the example application 500, no filters are selected and therefore all patients appropriate for display in this example may be shown.

In certain embodiments, the patient list 504 may be sorted according to various criteria. For example, the patient list 504 may be sorted in accordance with a prioritized intervention list based on the risk model data 436. The patient list 504 can be sorted according to other criteria. For example, for each intervention associated with the patients on the patient list 504, there is an associated route. A route may include transport information needed by the healthcare provider to reach the patient. For example, a route may be a map and directions provided by a mapping application, a bus or train route, or carpool information.

The patient list 504 may be sorted according to location of patients along a particular route, so that the healthcare provider can efficiently transit between patients. For example, the routes may incorporate predictive traffic data or other algorithms to sort routes in accordance with recommended interventions. In some examples, the generation and prioritization of the routes may be performed by a third-party and incorporated into the user application 404 by way of the data platform microservices application 428. The routes may be based on healthcare provider user data from other applications. Accordingly, the routes may incorporate additional locations besides patient locations. For example, the routes may contain the location of meals or errands. The routes may be based on the prioritized intervention list. For example, the prioritized intervention list may be used to sort patients initially, and then a subset of those prioritized patients can be further sorted according to geographic location along one or more routes.

The patient list 504 may include a location-based view (not shown) of scheduled outreaches and appointments. The location-based view may include one or more routes and the locations of patients. The locations of patients may include highlighting or color-coded information according to the prioritized intervention list. For example, the color coding may be used to indicate which patients have the greatest need of in-person outreach.

The patient list 504 includes groupings of related patients such as outreach patients list 507 and active patients list 520. Outreach patients list 507 may include patients that are scheduled for initial or follow-up outreach. For example, a patient 506 on the outreach patients list 507 may be identified as one requiring outreach based on the risk model data 436 including the prioritized intervention list output by the ensemble machine learning model 212. The patient 506 includes biographical and demographic data such as name, gender, and date of birth.

The outreach patients list 507 includes the outreach status 510. The outreach status 510 may correspond to whether or not outreach has yet occurred, in whole or in part. For instance, an outreach status 510 of "Outreach" may indicate that outreach is pending for a patient, whereas "Closed" indicates that outreach has occurred or is no longer required. The outreach status 510 may be updated by the user of the application 500 or may be updated automatically according to the risk model data 436. The outreach status 510 may also include additional categorial information to further contextualize the outreach status 510. For example, an outreach status 510 of "Outreach" may be accompanied by additional categorical information like "Gap Closure," "Rising Risk," or "Behavioral Health." "Gap Closure" may refer to a difference between the recommended course of treatment and what care a patient has actually received. These indications may correspond to one or more tags, flags, or other identifiers that have been associated with the patient using the GUI of the user application 404.

The outreach patients list 507 also includes the outreach attempts indicator 512 which can provide a visual indication of which means of outreach have already been attempted by a healthcare provider using the user application 404. The outreach attempts indicator 512 can include means of outreach including text message, telephone, email, telemedicine, and in-person contact, among other possible means.

In certain embodiments, the outreach patients list 507 may contain an indication of a recommended means of outreach based on the risk model data 436 including the prioritized intervention list output by the ensemble machine learning model 212. For example, the ensemble machine learning model 212 may determine, based on patient engagement data, which predicted risk may be minimized if an outreach is in-person versus via telephone or telemedicine.

When outreach with a patient has occurred, data related to one or more past outreach attempts is displayed in the last outreach indicator 514. For example, a freeform note describing the results of the most recent outreach with a patient may be displayed in the last outreach indicator 514. A notifications indicator 518 is associated with each patient on the outreach patients list 507. The notifications indicator 518 can provide an indication of unread or recent data related to the corresponding patient 506. For example, a checkbox in the notifications indicator 518 may indicate a task or goal that has been completed.

The active patients list 520 includes one or more patients, such as patient 522. Active patients list 520 may include patients under the treatment or supervision of the user of the user application 404, but who are not currently prioritized or in need of outreach. The patient 522 includes biographical and demographic data such as name, gender, and date of birth. The active patients list 520 also includes a status and support indicator 528. The status and support indicator 528 can provide a visual indication of the amount or intensity of care required or desired by the patient 522. For example, a status of "High" can indicate a significant allocation of healthcare provider resources or time for a patient with particularly demanding needs. The status and support level for patient 522 may be updated on a patient detail page.

The active patients list 520 may include one or more goals 530 associated with the patient 522. The goals 530 may be associated with patients on, for instance, a patient detail page, an example of which is discussed in FIG. 6. In some embodiments, goals may be associated with one or more interventions. The delivery of care may then be oriented around the accomplishing of particular goals, rather than particular interventions. Additionally, the organization of related interventions into goals can enable healthcare providers to be maximally efficient by scheduling related activities together.

The active patients list 520 also includes a next encounter indicator 532. The next encounter indicator 532 may contain information about upcoming appointments, meetings, treatments, or outreaches currently calendared for the patient 522. Like the outreach patients list 507, a notifications indicator 534 can provide an indication of unread or recent data related to the corresponding patient. The active patients list 520 also includes a team indicator 536, which can contain an indication of the identities of the healthcare providers associated with the patient 522.

Patients in both the outreach patients list 507 and the active patients list 520 may be bookmarked using the bookmark flags 508, 524. Bookmarked patients may be viewed by using the appropriate filter from among the filters 503.

The application 500 includes a system select button 526. The system selector button 526 can include options to select a user profile mode. For example, the user profile mode may contain information about the user of the example application like username, password, and so on. The system selector button 526 can include options to share data. For example, the share data option may allow a user of the example application 500 to send data to another healthcare provider, patient, or system administrator.

Figure 6:
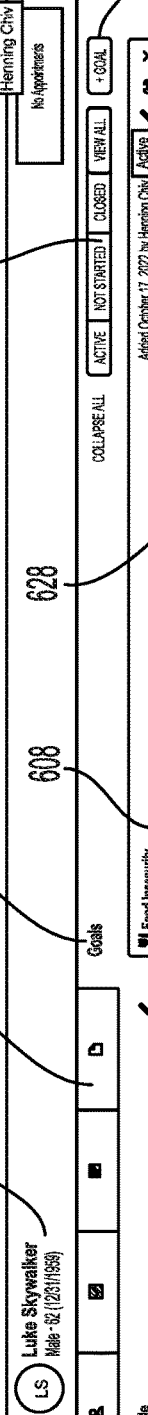
FIG. 6 shows an illustration of an example application for operationalizing predicted changes in risk based on interventions, according to some aspects of the present disclosure.

Referring now to FIG. 6, FIG. 6 shows an illustration of an example application 600 for operationalizing predicted changes in risk based on interventions, according to some aspects of the present disclosure. FIG. 6 depicts a patient detail information screen 602 for patient 522. In this example, the user of the example application 500 may select a patient from the active patients list 520 by, for example, clicking on it with a mouse, which may cause the patient detail information screen 602 to be shown. The patient detail information screen 602 includes several modes 604. For example, the modes 604 can include a patient detail mode, a task list mode, a communications mode, and a notes mode, among other possibilities. Example application 600 depicts the patient information mode. The patient information mode includes patient information such as patient profile 612, program details 614, primary contacts 616, and care team 618. The program details 614 may include information displayed in the patient list 504. For example, the program details may include information contained in the outreach status 510 or support status 528 indications from example application 500.

Patient detail information screen 602 for patient 522 includes a goals section 606. The goals section 606 includes one or more goals 608. Goals 608 may be associated with one or more patients. Goals 608 may include a name and a description. Goals may also include an icon. Both the name and the icon may be used to identify goals 608 in other contexts. Goals 608 are created with the new goal button 609. A goal may have a status 611. The goal status 611 can indicate the current importance or priority of a given goal. For example, a goal can be "Active," "Inactive," or "Completed," among other possible statuses. The goals 608 can be filtered using the goals filter selector 610, which may be used to filter by, among other options, status 611. For example, selecting "View All" displays all goals 608, regardless of status 611.

Patient detail information screen 602 for patient 522 includes an encounter notes section 622. New encounter notes may be created using the encounter notes creation dialog box 626. A new encounter note may contain one or more properties 628. Encounter note properties 628 can include encounter type, healthcare provider, contact type, location, date, start time, end time, and an indication of whether the encounter occurred, or others. A new encounter note may be associated with one or more goals 608 using the encounter note goals selector 634. Encounter note freeform text is entered in the encounter note text box 630 and can be formatted using the encounter note formatting tools 636. After being entered by a user of the user application 404, the freeform text entered in the encounter note text box 630 can be sent for temporary or permanent storage to risk model data 412 and subsequently ingested by the data platform microservices application 428 for analysis. Freeform text can be converted into analyzed text using, for example, coding, markup, NLP models, or other algorithms.

In some examples, text analyzed using NLP may be used to implement an autocomplete functionality. For example, context obtained from NLP modeling of encounter note data may be used to suggest appropriate or relevant words as the encounter note is being created. In one example, text may be analyzed using NLP as it is entered into the text box 630. The analyzed text may be used for autocompleting sentences and encounter notes to assist in improving staff notetaking efficiency or to identify highly-sensitive medical conditions requiring extensive documentation. NLP may also be used to identify words or phrases that require further provider action due to requirements related to, for example, privacy or Health Insurance Portability and Accountability Act ("HIPAA") concerns. Text analyzed using NLP may be used for other applications, including the generation of machine-generated speech for automated communication with patients. Such machine-generated speech may be used to assist patients with issues including, for example, scheduling or navigation.

The encounter note text box 630 may include a template expander. A template expander may include software program code to detect the presence of pre-determined text sequences in the encounter note text box 630 while a new encounter note is being created. Upon detection of a pre-determined text sequence, the application 600 may populate the encounter note text box 630 with one or more templates. The application 600 may provide a dialog box or similar GUI element to accept input from the user to further populate the templates. In certain embodiments, the template expander may receive input from the ensemble machine learning model 212 via the risk model data 436 input to the data platform microservices application 428. The templates generated following detection of the pre-determined text sequence may be pre-populated with data determined by the ensemble machine learning model 212. For example, a user of the user application may enter a pre-determined text sequence like "/foodinsecurity" into the encounter note text box 630. The pre-determined text sequence may cause a dialog box to appear in the GUI that is pre-populated with information associated with a food security intervention for a specific patient, according to outputs of the ensemble machine learning model 212.

The application 600 includes a system select button 620. Like the example application 500, the system selector button 620 can include options to select a user profile mode. For example, the user profile mode may contain information about the user of the example application like username, password, and so on. The system selector button 620 can include options to share data. For example, the share data option may allow a user of the example application to send data to another healthcare provider, patient, or system administrator.

Figure 7A:
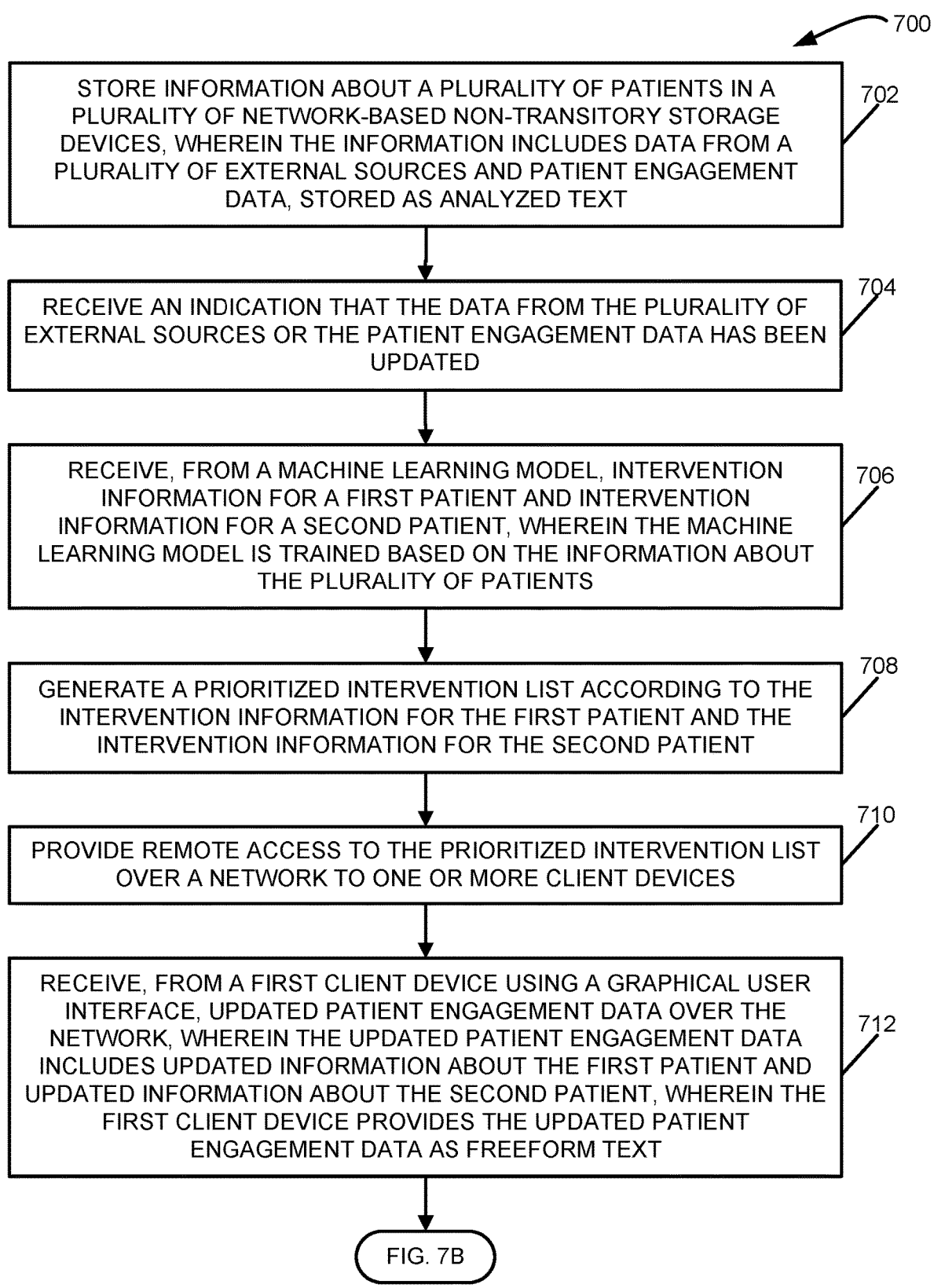
FIGS. 7A-B show an example method for operationalizing predicted changes in risk based on interventions, according to some aspects of the present disclosure.
Figure 7B:
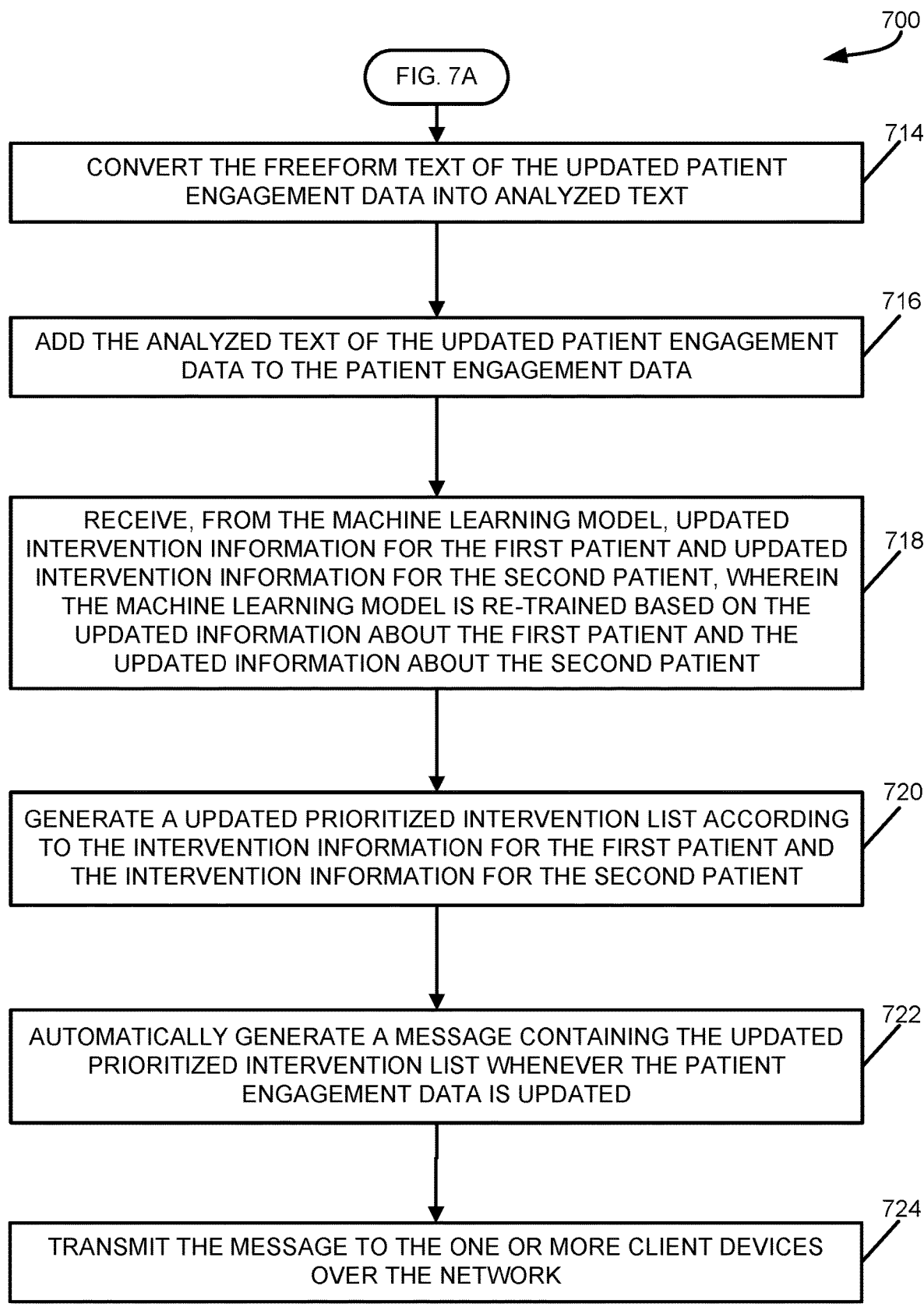

Referring now to FIGS. 7A-B, FIGS. 7A-B show an example method 700 for operationalizing predicted changes in risk based on interventions, according to some aspects of the present disclosure. These methods can be implemented by the healthcare data manager 202 of system 200, the healthcare CRM depicted by system 400, or any other suitable component. These methods can be read with reference to the examples of FIGS. 1-6 for illustrative purposes. It should be appreciated that this example method 700 provides a particular method for operationalizing predicted changes in risk based on interventions. Other sequences of operations may also be performed according to alternative examples. For example, alternative examples of the present invention may perform the steps outlined above in a different order. Moreover, the individual operations illustrated by these methods may include multiple sub-operations that may be performed in various sequences as appropriate to the individual operation. Furthermore, additional operations may be added or removed depending on the particular applications. One of ordinary skill in the art would recognize many variations, modifications, and alternatives.

Turning first to block 702, in block 702 a computing device can store information about a plurality of patients in a plurality of network-based non-transitory storage devices, wherein the information includes data from a plurality of external sources and patient engagement data, stored as analyzed text. The computing device may be a healthcare data manager 202, a module from the example system 400, like the healthcare CRM module 402 or the data platform module 403, or other suitable device. For example, the data platform module 403 can store data from the external sources including ADT feeds 432, claims data 434, and risk model data 436, risk model data 412, among others. Analyzed text may be coded, marked up using a system of annotations, translated, interpreted by a pre-trained natural language processing ("NLP") model, or other suitable format for inclusion in the training data 216. Storage of textual information as analyzed text may be needed for use in one or more computer programs. For instance, the risk model data 412 may be used to train the ensemble machine learning model 212, which may include a neural network. The risk model data 412 may be received as freeform text/SMS messages, as encounter notes, or other suitable format. The risk model data 412 must first be encoded into an embedded representation like Bidirectional Encoder Representations from Transformers ("BERT") encoding model for processing by a neural network or other machine learning algorithm. In certain embodiments, textual data may be stored as unstructured data, for example, in a data lake 424. The unstructured data may be converted to analyzed text after it is first stored as unstructured data or converted to analyzed text immediately before it is used in some other component (e.g., just-in-time ("JIT") analysis).

At block 704, the computing device may receive an indication that the data from the plurality of external sources or the patient engagement data has been updated. The update may trigger the ensemble machine learning model 212 to generate one or more predictions. In some examples, the data included in the update may be added to the training data 216. The addition of data to the training data 216 may cause the ensemble machine learning model 212 model to re-retrain, such that the predictions of risk and changes in risk accord with the updated training data 216. For example, the risk prediction and change in risk prediction may be generated upon the receipt of data from an external source like ADT data 302, including an ADT data stream, upon the receipt of monthly eligibility files from an MCO, or upon feedback from a healthcare provider using the healthcare CRM 224. In other examples, the risk prediction may be generated upon updates to the ensemble machine learning model 212 following updates to the model from online training from feedback or from the model configuration module 222.

At block 706, the computing device may receive, from a machine learning model, intervention information for a first patient and intervention information for a second patient, wherein the machine learning model is trained based on the information about the plurality of patients. For example, the data platform module 403 may receive risk model data 436 from the ensemble machine learning model 212. The risk model data 436 may include intervention information including predicted risk and predicted changes in risk for particular interventions for particular patients. For instance, the intervention information may be a list of one or more interventions associated with one or more patients, along with some measure of the probability of success of those interventions. In some examples, the intervention information may include a score or ranking corresponding to predicted probabilities of positive outcomes, or other quantitative criteria for sorting interventions.

At block 708, the computing device may generate a prioritized intervention list according to the intervention information for the first patient and the intervention information for the second patient. For example, the intervention information may be sorted according to the score received in 706. However, other criteria may be used in addition to or instead of the score to prioritize the interventions. For example, generating the prioritized intervention list may take into account factors including patient location, goals, outreach status, support status, or other criteria. The criteria may include data received from users of the user application 404 by way of the risk model data 412 stored in the healthcare CRM module database 410. For example, updating a patient from the active patient list 520 to a support status 528 of "Maximum" may increase the position of one or more interventions associated with that patient in the prioritized intervention list.

At block 710, the computing device may provide remote access to the prioritized intervention list over a network to one or more client devices. For example, the prioritized intervention list may be provided to the user application 404 by the data platform microservices application 428 and displayed on the screen of one or more client devices using a suitable GUI. For instance, the prioritized patient list may appear on a GUI using a presentation similar to patient list 504. The one or more client devices may access the user application 404 in a web browser or using another application configured to receive and display information from an API provided by the user application 404.

The remote access to the prioritized intervention list can include one or more processes for notifying the one or more client devices of the remote access. For example, the computing device may generate a message including an indication that remote access to the prioritized intervention list is available. The computing device can send the message to the one or more client devices by various means including, for example, email, push notifications, SMS/text messages. The notifications may cause the healthcare provider users of the client devices to perform interventions, change a plan of interventions, change routes, reprioritize, or other changes to the administration of healthcare.

At block 712, the computing device may receive, from a first client device using a GUI, updated patient engagement data over the network, wherein the updated patient engagement data includes updated information about the first patient and updated information about the second patient, wherein the first client device provides the updated patient engagement data as freeform text. For example, a user of the user application 404 using a client device, may update one or more freeform text fields provided by the GUI of the user application 404. Example freeform text fields from example applications 500 and 600 include the last outreach indicator 514, next encounter indicator 532, and encounter note 630. Freeform text may come from other sources including, for example, text/SMS messages, emails, telephone calls, telemedicine visits, video conferences or meetings, or other sources. In some cases, transcription using audio-to-speech technology may be first required to receive the updated patient information.

At block 714, the computing device may convert the freeform text of the updated patient engagement data into analyzed text. Freeform text may be converted to analyzed text through coding, marking up the transcribed text up using a system of annotations, translating, interpretation by a pre-trained natural language processing ("NLP") model, or other suitable technique for use by the components of example system 400 or one or more machine learning models. Pre-trained NLP models may include publicly available pre-trained models such as Bidirectional Encoder Representations from Transformers ("BERT") and Generative Pre-trained Transformer ("GPT") 3. More than one method of analyzing text may be used. Different components of the example systems discussed herein may require differently formatted input text for use in application or in training a machine learning model.

At block 716, the computing device may add the analyzed text of the updated patient engagement data to the patient engagement data. For example, a component of the data platform module 403 may send the analyzed text to the patient engagement data 206 of the healthcare data manager 202. The healthcare data manager 202 can associate the analyzed text with one or more patients and add it to the patient engagement data 206 already stored. Because the patient engagement data 206 can take many forms, as illustrated in FIG. 3, analyzed text may accordingly take many forms. For example, patient narratives 316 may be stored as text encoded using a model like BERT, whereas social service program participation 330 may be stored in a standardized form. In both cases, the initial input may take the form of freeform text, like a text message, and later be converted into the appropriate form in 714.

At block 718, the computing device may receive, from the machine learning model, updated intervention information for the first patient and updated intervention information for the second patient, wherein the machine learning model is re-trained based on the updated information about the first patient and the updated information about the second patient. The receipt of the updated patient engagement data may act as a trigger for re-training of the ensemble machine learning model 212. Once the analyzed text is incorporated into the patient engagement data 206, the patient engagement data 206 along with the training data 216 can be used to re-retrain the ensemble machine learning model.

At block 720, the computing device may generate an updated prioritized intervention list according to the intervention information for the first patient and the intervention information for the second patient. The updated prioritized intervention list is similar to the one generated at 708, however the updated list incorporates feedback in the form of the analyzed text added to the patient engagement data 206.

At block 722, the computing device may automatically generate a message containing the updated prioritized intervention list whenever the patient engagement data is updated. The message may be in any machine-readable format, suitable for transmission including, for example, JSON or XML. In some examples, the message may include pre-formatted text in a format appropriate for email, text message, or other written communication like HTML. For example, the message may contain details about which patients and interventions are affected by the updated patient engagement data.

At block 724, the computing device may transmit the message to the one or more client devices over the network. For example, users of the user application 404 on client devices may receive the message in the form of a notification while using the GUI of the user application 404. Alternatively, the message may be received by email or text/SMS message. For example, the computing device may generate a message including an indication that the prioritized intervention list has been updated. The computing device can send the message to the one or more client devices by various means including, for example, email, push notifications, SMS/text messages. Because the list has been updated, the notifications may cause the healthcare provider users of the client devices to perform interventions, change a plan of interventions, change routes, reprioritize, or other changes to the administration of healthcare.

Figure 8:
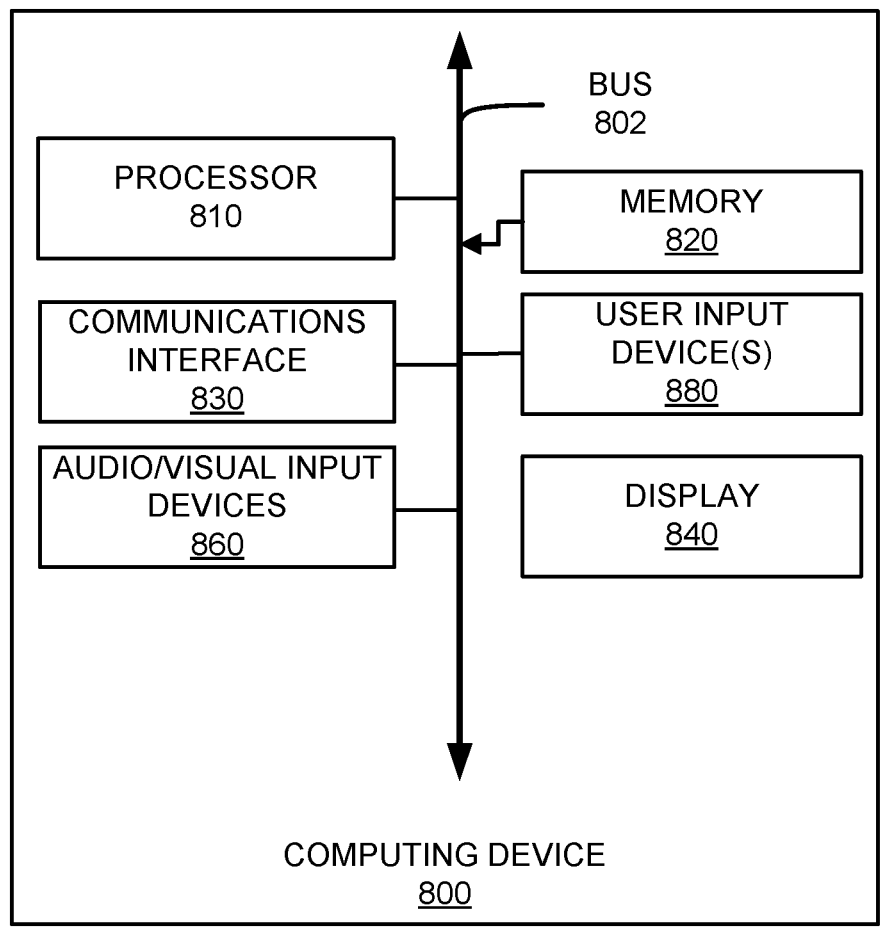
FIG. 8 shows an example computing device suitable for operationalizing predicted changes in risk based on interventions, according to some aspects of the present disclosure.

Referring now to FIG. 8, FIG. 8 shows an example computing device 800 suitable for operationalizing predicted changes in risk based on interventions, according to some aspects of the present disclosure. The example computing device 800 includes a processor 810 which is in communication with the memory 820 and other components of the computing device 800 using one or more communications buses 802. The processor 810 is configured to execute processor-executable instructions stored in the memory 820 to perform one or more methods for operationalizing predicted changes in risk based on interventions according to different examples, such as part or all of the example method 700 described above with respect to FIGS. 1-6. The computing device 800, in this example, also includes one or more user input devices 880, such as a keyboard, mouse, touchscreen, microphone, etc., to accept user input. The computing device 800 also includes a display 840 to provide visual output to a user.

The computer device 800 may also include one or more audio/visual input devices 860 to enhance a user's ability to give input to or receive input from a multimedia application or feature, such as a video conference, entertainment application, accessibility features, VR headset, or the like.

The computing device 800 also includes a communications interface 830. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A computer-implemented method, comprising:
storing information about a plurality of patients in a plurality of network-based non-transitory storage devices, wherein the information includes:
data from a plurality of external sources; and
patient engagement data based on healthcare provider interactions with at least a subset of the plurality of patients, stored as analyzed text;
receiving, from an ensemble machine learning model, intervention information for a first patient and intervention information for a second patient, the intervention information for the first patient and the intervention information for the second patients each comprising a respective first prediction of risk for one or more interventions or a second prediction of a change in risk for the one or more interventions, wherein the first prediction and the second prediction are different for the first patient and the second patient and wherein the ensemble machine learning model:
is trained based on the information about the plurality of patients; and
comprises one or more machine learning models that determine the intervention information for the first and second patients using a weighted composite output that combines outputs of the one or more machine learning models;

generating a prioritized intervention list according to the intervention information for the first patient and the intervention information for the second patient;

providing remote access to the prioritized intervention list over a network to one or more client devices;

receiving, from a first client device using a graphical user interface, updated patient engagement data over the network, wherein the updated patient engagement data includes updated information about the first patient and updated information about the second patient, wherein the first client device provides the updated patient engagement data as freeform text;

converting the freeform text of the updated patient engagement data into analyzed text;

adding the analyzed text of the updated patient engagement data to the patient engagement data;

receiving, from the ensemble machine learning model, updated intervention information for the first patient and updated intervention information for the second patient, the updated intervention information for the first patient and the updated intervention information for the second patient each comprising an updated prediction of risk for a first intervention or an updated prediction of a change in risk for the first intervention for the respective first and second patients, wherein the ensemble machine learning model is re-trained based on the updated information about the first patient and the updated information about the second patient;

generating an updated prioritized intervention list according to the updated intervention information for the first patient and the updated intervention information for the second patient;

automatically generating a message containing the updated prioritized intervention list whenever the patient engagement data is updated; and transmitting the message to the one or more client devices over the network.

2. The method of claim 1, wherein the freeform text of the updated patient engagement data comprises one or more encounter notes entered into the first client device using the graphical user interface.

3. The method of claim 1, wherein the graphical user interface of the first client device includes a patient list including the first patient and the second patient, wherein the patient list is sorted according to the prioritized intervention list.

4. The method of claim 3, wherein the patient list includes one or more goals associated with the first patient and the second patient.

5. The method of claim 4, wherein the freeform text of the updated patient engagement data comprises one or more encounter notes entered into the first client device using the graphical user interface, wherein the one or more encounter notes are associated with the one or more goals.

6. The method of claim 3, wherein the patient list includes one or more routes associated with the first patient and the second patient, the one or more routes based on the prioritized intervention list.

7. The method of claim 1, wherein the updated information about the first patient and the updated information about the second patient further includes data about personality traits, behaviors, and preferences of the first patient and the second patient.

8. A system comprising:
one or more processors configured to:
store information about a plurality of patients in a plurality of network-based non-transitory storage devices, wherein the information includes:
data from a plurality of external sources; and
patient engagement data based on healthcare provider interactions with at least a subset of the plurality of patients, stored as analyzed text;

receive, from an ensemble machine learning model, intervention information for a first patient and intervention information for a second patient, the intervention information for the first patient and the intervention information for the second patients each comprising a respective first prediction of risk for one or more interventions or a second prediction of a change in risk for the one or more interventions, wherein the first prediction and the second prediction are different for the first patient and the second patient and wherein the ensemble machine learning model:
is trained based on the information about the plurality of patients; and
comprises one or more machine learning models that determine the intervention information for the first and second patients using a weighted composite output that combines outputs of the one or more machine learning models;

generate a prioritized intervention list according to the intervention information for the first patient and the intervention information for the second patient;

provide remote access to the prioritized intervention list over a network to one or more client devices;

receive, from a first client device using a graphical user interface, updated patient engagement data over the network, wherein the updated patient engagement data includes updated information about the first patient and updated information about the second patient, wherein the first client device provides the updated patient engagement data as freeform text;

convert the freeform text of the updated patient engagement data into analyzed text;

add the analyzed text of the updated patient engagement data to the patient engagement data;

receive, from the ensemble machine learning model, updated intervention information for the first patient and updated intervention information for the second patient, the updated intervention information for the first patient and the updated intervention information for the second patient each comprising an updated prediction of risk for a first intervention or an updated prediction of a change in risk for the first intervention for the respective first and second patients, wherein the ensemble machine learning model is re-trained based on the updated information about the first patient and the updated information about the second patient;

generate an updated prioritized intervention list according to the updated intervention information for the first patient and the updated intervention information for the second patient;

automatically generate a message containing the updated prioritized intervention list whenever the patient engagement data is updated; and transmit the message to the one or more client devices over the network.

9. The system of claim 8, wherein the freeform text of the updated patient engagement data comprises one or more encounter notes entered into the first client device using the graphical user interface.

10. The system of claim 8, wherein the graphical user interface of the first client device includes a patient list including the first patient and the second patient, wherein the patient list is sorted according to the prioritized intervention list.

11. The system of claim 10, wherein the patient list includes one or more goals associated with the first patient and the second patient.

12. The system of claim 11, wherein the freeform text of the updated patient engagement data comprises one or more encounter notes entered into the first client device using the graphical user interface, wherein the one or more encounter notes are associated with the one or more goals.

13. The system of claim 10, wherein the patient list includes one or more routes associated with the first patient and the second patient, the one or more routes based on the prioritized intervention list.

14. The system of claim 8, wherein the updated information about the first patient and the updated information about the second patient further includes data about personality traits, behaviors, and preferences of the first patient and the second patient.

15. A non-transitory computer-readable medium storing a set of instructions, the set of instructions comprising:
one or more instructions that, when executed by one or more processors of a device, cause the device to:
store information about a plurality of patients in a plurality of network-based non-transitory storage devices, wherein the information includes:
data from a plurality of external sources; and
patient engagement data based on healthcare provider interactions with at least a subset of the plurality of patients, stored as analyzed text;
receive, from an ensemble machine learning model, intervention information for a first patient and intervention information for a second patient, the intervention information for the first patient and the intervention information for the second patients each comprising a respective first prediction of risk for one or more interventions or a second prediction of a change in risk for the one or more interventions, wherein the first prediction and the second prediction are different for the first patient and the second patient and wherein the ensemble machine learning model:
is trained based on the information about the plurality of patients; and
comprises one or more machine learning models that determine the intervention information for the first and second patients using a weighted composite output that combines outputs of the one or more machine learning models;
generate a prioritized intervention list according to the intervention information for the first patient and the intervention information for the second patient;
provide remote access to the prioritized intervention list over a network to one or more client devices;
receive, from a first client device using a graphical user interface, updated patient engagement data over the network, wherein the updated patient engagement data includes updated information about the first patient and updated information about the second patient, wherein the first client device provides the updated patient engagement data as freeform text;
convert the freeform text of the updated patient engagement data into analyzed text;
add the analyzed text of the updated patient engagement data to the patient engagement data;
receive, from the ensemble machine learning model, updated intervention information for the first patient and updated intervention information for the second patient, the updated intervention information for the first patient and the updated intervention information for the second patient each comprising an updated prediction of risk for a first intervention or an updated prediction of a change in risk for the first intervention for the respective first and second patients, wherein the ensemble machine learning model is re-trained based on the updated information about the first patient and the updated information about the second patient;
generate an updated prioritized intervention list according to the updated intervention information for the first patient and the updated intervention information for the second patient;
automatically generate a message containing the updated prioritized intervention list whenever the patient engagement data is updated; and
transmit the message to the one or more client devices over the network.

16. The non-transitory computer-readable medium of claim 15, wherein the freeform text of the updated patient engagement data comprises one or more encounter notes entered into the first client device using the graphical user interface.

17. The non-transitory computer-readable medium of claim 15, wherein the graphical user interface of the first client device includes a patient list including the first patient and the second patient, wherein the patient list is sorted according to the prioritized intervention list.

18. The non-transitory computer-readable medium of claim 17, wherein the patient list includes one or more goals associated with the first patient and the second patient.

19. The non-transitory computer-readable medium of claim 18, wherein the freeform text of the updated patient engagement data comprises one or more encounter notes entered into the first client device using the graphical user interface, wherein the one or more encounter notes are associated with the one or more goals.

20. The non-transitory computer-readable medium of claim 15, wherein the updated information about the first patient and the updated information about the second patient further includes data about personality traits, behaviors, and preferences of the first patient and the second patient.

\* \* \* \* \*